United States Patent
Toda

(10) Patent No.: US 8,413,013 B2
(45) Date of Patent: Apr. 2, 2013

(54) MEMORY SYSTEM

(75) Inventor: Haruki Toda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1061 days.

(21) Appl. No.: 12/359,555

(22) Filed: Jan. 26, 2009

(65) Prior Publication Data

US 2009/0198881 A1 Aug. 6, 2009

(30) Foreign Application Priority Data

Jan. 31, 2008 (JP) ................................. 2008-021271

(51) Int. Cl.
*G11C 29/00* (2006.01)
(52) U.S. Cl. ........................................................ 714/763
(58) Field of Classification Search .................. 714/763
See application file for complete search history.

(56) References Cited

U.S. PATENT DOCUMENTS

| | | | |
|---|---|---|---|
| 4,475,194 A | 10/1984 | LaVallee et al. | |
| 5,710,515 A * | 1/1998 | Teggatz et al. | 324/762.02 |
| 5,867,642 A * | 2/1999 | Vivio et al. | 714/6.13 |
| 6,456,540 B1 * | 9/2002 | Baltar et al. | 365/189.09 |
| 6,728,138 B2 | 4/2004 | Katayama et al. | |
| 7,958,346 B2 * | 6/2011 | Wong | 713/151 |
| 2002/0152442 A1 * | 10/2002 | Shau | 714/779 |
| 2004/0022249 A1 | 2/2004 | Katayama et al. | |
| 2008/0002456 A1 | 1/2008 | Toda et al. | |

FOREIGN PATENT DOCUMENTS

| | | |
|---|---|---|
| JP | 10-27496 A | 1/1998 |
| WO | WO 2008/099723 A1 | 8/2008 |

OTHER PUBLICATIONS

U.S. Appl. No. 12/549,948, filed Aug. 28, 2009, Toda.
U.S. Appl. No. 12/691,169, filed Jan. 21, 2010, Toda.
U.S. Appl. No. 12/607,432, filed Oct. 28, 2009, Toda.
U.S. Appl. No. 12/605,799, filed Oct. 26, 2009, Toda.
U.S. Appl. No. 13/011,278, filed Jan. 21, 2011, Toda.
U.S. Appl. No. 13/011,318, filed Jan. 21, 2011, Toda.
U.S. Appl. No. 12/501,116, filed Jul. 10, 2009, Toda.
U.S. Appl. No. 12/524,880, filed Jul. 29, 2009, Toda.
Japanese Office Action issued Jun. 12, 2012 in Patent Application No. 2008-021271 with English Translation.

* cited by examiner

*Primary Examiner* — M. Mujtaba K Chaudry
*Assistant Examiner* — Enam Ahmed
(74) *Attorney, Agent, or Firm* — Oblon, Spivak, McClelland, Maier & Neustadt, L.L.P.

(57) ABSTRACT

A memory system including: a memory device; an ECC system installed in the memory device so as to generate a warning signal in case there are uncorrectable errors; an address generating circuit for generating internal addresses in place of bad area addresses in accordance with the waning signal, the progressing of the internal addresses being selected as to avoid address collision with the address progressing of the memory device at least at the beginning; and a CAM for storing the internal addresses as substitutive area addresses, the CAM being referred to at an access time of the memory device so as to generate the substitutive area addresses in place of the bad area addresses in accordance with the warning signal.

17 Claims, 30 Drawing Sheets

Module Unit

FIG. 21

| Cell | Pair 0 (high res.) | | Pair 1 (low res.) | |
|---|---|---|---|---|
| Sig | 0 | 1 | 0 | 1 |
| V1 | L | H | L | L |
| V2 | H | H | L | H |

FIG. 22

| Cell | Pair (01) (LR) | |
|---|---|---|
| Sig | 0 | 1 |
| V1 | L | H |
| V2 | L | H |

FIG. 24

| Cell | 0 | | 1 | |
|---|---|---|---|---|
|  | imoni (level) | switch (state) | imoni (level) | switch (state) |
| initial | H | on | L | on |
| prog. comp. | L (current decrease) | off | H (current increase) | off |

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| α | 0 | 1 | 2 | 3 | 0 | 1 | 2 | 3 | 0 | 1 | 2  | 3  | 0  | 1  | 2  | 3  |
| β | 0 | | | | 1 | | | | 2 | | | | 3 | | | |

| i | 16 | 17 | 18 | 19 | 20 | 21 | 22 | 23 | 24 | 25 | 26 | 27 | 28 | 29 | 30 | 31 |
|---|----|----|----|----|----|----|----|----|----|----|----|----|----|----|----|----|
| α | 0  | 1  | 2  | 3  | 0  | 1  | 2  | 3  | 0  | 1  | 2  | 3  | 0  | 1  | 2  | 3  |
| β | 4  |    |    |    | 5  |    |    |    | 6  |    |    |    | 7  |    |    |    |

MEMORY SYSTEM

CROSS-REFERENCE TO RELATED APPLICATION

This application is based on and claims the benefit of priority from the prior Japanese Patent Application No. 2008-021271, filed on Jan. 31, 2008, the entire contents of which are incorporated herein by reference.

BACKGROUND OF THE INVENTION

1. Field of the Invention

This invention relates to a memory system having a memory device and an error detecting and correcting system installed therein.

2. Description of the Related Art

An electrically rewritable and non-volatile memory device has a feature that the error rate increases as the number of rewrite cycles increases. Specifically, the error rate will be increased more as the integration is improved. Therefore, it is used recently such a technology that an ECC (error correcting code) circuit is installed in a memory chip or a memory controller used for controlling the memory chip (for example, see JP-A-2000-173289).

On the other hand, it is not required of a large capacitive file memory to be a perfectly good product, and there is no problem in practice while there is a sufficiently usable part as a memory area. In this case, it becomes important to be able to avoid certainly bad cell areas. In addition, it becomes necessary to use an ECC circuit, which detects and corrects errors in the memory device. To be able to use a number of data, it is required of the ECC circuit to have such a real time processing rate that is able to prevent the memory device from being delayed in the data transfer.

There has already been proposed an on-chip ECC system, which is configured to generate a warning signal when there are uncorrectable errors in the memory device (for example, see JP-A-2007-305276).

SUMMARY OF THE INVENTION

According to an aspect of the present invention, there is provided a memory system including:

a memory device;

an error detecting and correcting system installed in the memory device so as to generate a warning signal in case there are uncorrectable errors in the memory device;

an address generating circuit configured to generate internal addresses in place of bad area addresses in accordance with the waning signal, the progressing of the internal addresses being selected in such a manner as to avoid address collision with the address progressing of the memory device at least at the beginning of it; and a content addressable memory configured to store the internal addresses as substitutive area addresses, the content addressable memory being referred to at an access time of the memory device so as to generate the substitutive area addresses in place of the bad area addresses in accordance with the warning signal.

According to another aspect of the present invention, there is provided a memory system including:

a memory device;

an error detecting and correcting system installed in the memory device so as to generate a warning signal in case there are uncorrectable errors in the memory device; and a content addressable memory configured to store substitutive area addresses, the content addressable memory being referred to when accessing the memory device so as to generate the substitutive area addresses in place of bad area addresses in accordance with the warning signal, wherein the content addressable memory includes: a non-volatile memory circuit formed of non-volatile semiconductor memory cells; and a current cutter circuit selectively coupled to the memory cell at a write time of the memory cell so as to monitor current flowing therein and cut off it when detecting the write completion.

According to still another aspect of the present invention, there is provided a memory device including:

a non-volatile memory circuit with memory cells having variable resistance elements; and a current cutter circuit selectively coupled to the memory cell at a write time of the memory cell so as to monitor current flowing therein and cut off it when detecting the write completion.

BRIEF DESCRIPTION OF THE DRAWINGS

FIG. 21 is a table for explaining the operation of the written bit match circuit.

FIG. 22 is a table for explaining the operation of the unwritten bit match circuit.

FIG. 24 is a table for explaining the operation of the current cutter circuit.

DETAILED DESCRIPTION OF THE EMBODIMENTS

Figure 1:
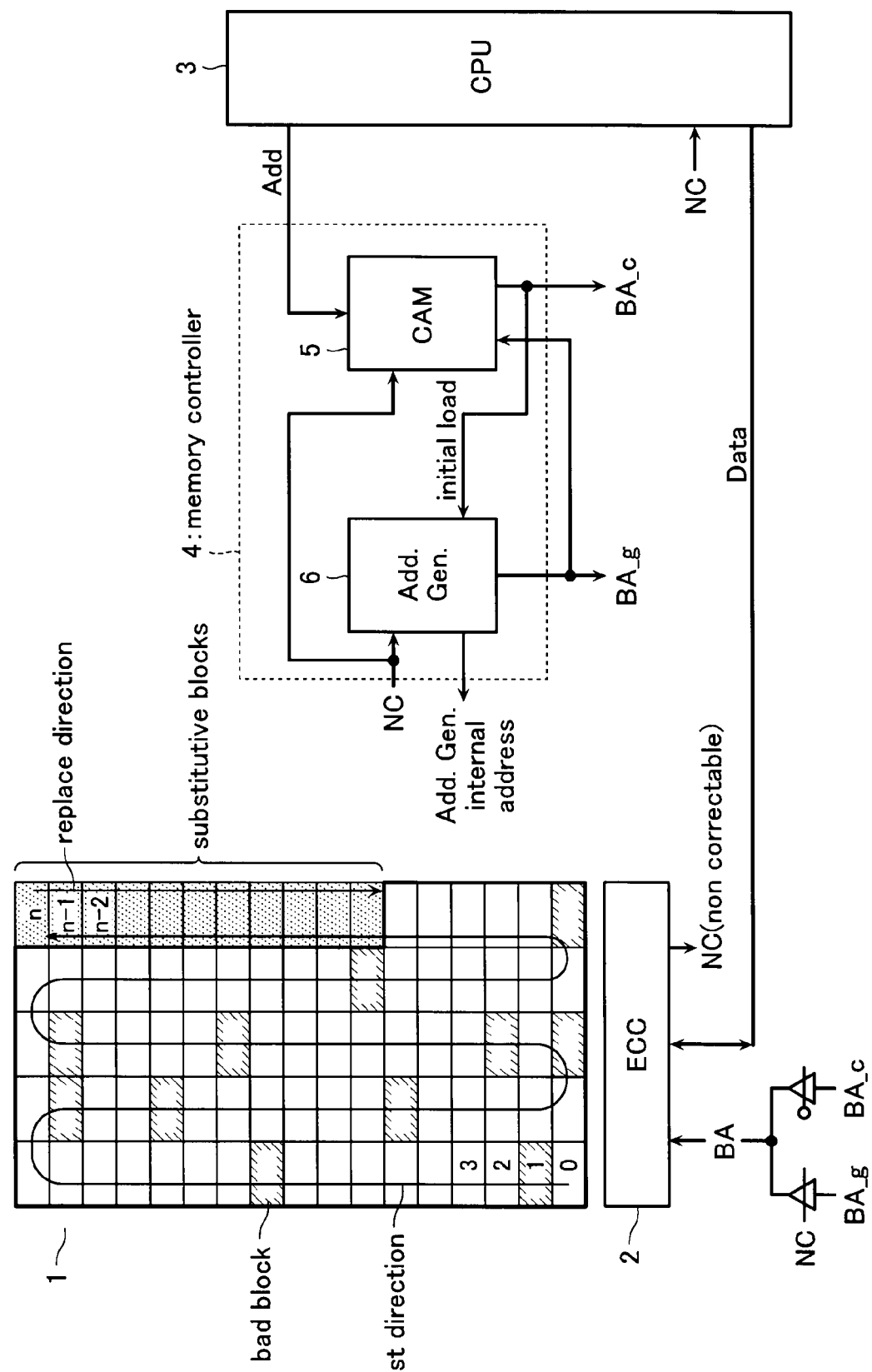
FIG. 1 shows a configuration of a memory system in accordance with an embodiment of the present invention.

In the embodiments described below, it will be explained a file memory with a three-dimensional (3D) cell array, which is a test-free memory system (i.e., there is no need of testing for detecting errors) with an on-chip ECC circuit installed. In case the ECC system is able to execute real time correcting processes and output a warning signal for noticing that there are uncorrectable errors (referred to as an non-correctable signal, hereinafter), it is able to constitute such the test-free memory system. In the embodiment described below, the warning signal will be referred to as "non-correctable" signal NC.

Technical elements used in the embodiment will be summarized as follows.

An error detecting and correcting system (referred to as an ECC system hereinafter) is installed in the memory device, which generates a warning signal when there are generated uncorrectable errors in the memory device. In case the ECC system generates the warning signal when an address is accessed, another memory address, which does not cause the system to generate such the warning, is used in place of the accessed and uncorrectable area address (referred simply to as a bad area address or a bad address).

The memory system has a content addressable memory (CAM), which is referred to when the memory is accessed. In case the warning signal is generated from the ECC system when an address is accessed, the CAM stores the accessed address as a key address, and additionally stores a substitutive area address to be generated in place of the key address, the area designated by which is correctable.

To replace the bad area address with the substitutive area address by use of the CAM, an externally supplied address is always applied to the CAM at every access time. When address matching is not detected in the CAM, the externally supplied address is output as it is, and the substitutive area address stored to be corresponded to the key address will be output in place of the externally supplied address when it is matched with the key address.

The CAM to be referred to at every access time has: a decoder circuit configured to store the externally supplied address used for accessing the memory as key address data; a content holding block configured to store substitutive area address data, which correspond to the key address data and those for memory areas correctable by the ECC system; and a shift counter circuit configured to sequentially select decoders to set the key address data in accordance with the number of toggles of the warning signal.

The shift counter circuit constituting the above-described CAM has state-holding memory elements for storing the shift states in a non-volatile manner during the power supply off. At a power-on time, the shift state is set at that obtained just before the power-off, so that data of the content holding block corresponding to the decoder selected by the shift counter circuit is read out, and the substitutive address generating circuit is initialized.

To replace the bad area addresses with the substitutive area addresses, it is used such an internal address generating circuit that the substitutive addresses progress non-reversibly in order in one direction.

To replace the bad area addresses with the substitutive addresses, it is used such an internal address generating circuit that the progressing direction of addresses assigned to the memory and that of the substitutive addresses are reversed to each other.

To replace the bad area addresses with the substitutive addresses, it is used such an internal address generating circuit that the progressing direction of the internal addresses is reversed to that of memory test-use addresses, and current address state thereof designates the effective capacity of the memory system freely usable.

In case the memory device is formed of memory cells, each of which has a variable resistance element for storing a resistance state in a non-volatile manner, a current cutter circuit is used for setting the resistance state of the variable resistance element. The current cutter circuit includes: a switch device for changing the impedance state between the variable resistance element and the power supply; a state transition circuit used for controlling the switch device; and a current monitor device for changing the state of the state transition circuit.

That is, the current cutter circuit functions as follows: when setting a low resistance state in the variable resistance element, detecting current flowing with a certain level or more in the current monitor device, the initial state of the state transition circuit is changed, and the switch device is set in a cut-off state or a high impedance state; and when setting a high resistance state in the variable resistance element, detecting current flowing with another level in the current monitor device, another initial state of the state transition circuit is changed, and the switch device is set in a cut-off state or a high impedance state.

A memory device is formed of multiple cell arrays stacked to constitute a cell array block, each of which has word lines and bit lines arranged to form the rows and columns of a matrix; and memory cells including variable resistance elements to be disposed at crossing points thereof. In the cell array block, signals are sent alternately from two side terminals of the word lines; and signals are sent alternately from two side terminals of the bit lines. For this purpose, vertical via-wirings are disposed on four sides of the cell array block for drawing the word lines and bit lines to the circuit area on the underlying substrate.

The layout of the data bus on the circuit area underlying the cell array block is as follows: a first data bus is disposed at the central portion between two side terminals of the bit lines; and second data buses are disposed on the both side spaces prepared between the cell array block and the vertical wirings so as to cross the first data bus and draw the first data bus outside of the cell array block area.

A file memory in accordance with an embodiment will be explained in detail below.

[File Memory System]

FIG. 1 shows a schematic configuration of the file memory system in accordance with an embodiment. File memory 1 has an on-chip ECC circuit 2. ECC circuit 2 is formed to generate a warning signal (referred to as "non-correctable" signal NC, hereinafter) for designating in real time that there are errors uncorrectable by the ECC circuit 2 outside of the chip.

Using this non-correctable signal NC, without testing whether the cells in the memory area of the file memory 1 are good or not for selecting chips, it becomes possible to constitute such a memory system that the memory chip is usable as if there is no bad cell in the chip when referring it from the external. It should be noted here that it is required of the ECC circuit itself to be subjected to a sufficient test, thereby being verified to have no errors.

The memory area of the file memory 1 is divided into plural "blocks", BLK0-BLKn, which are defined as data units or groups each being an access-unit and error-corrected by ECC circuit 2. ECC circuit 2 is able to correct a certain number of errors generated in a block, and if there are uncorrectable errors more than a predetermined value, it generates the non-correctable signal NC.

In accordance with non-correctable signal NC sent from the file memory 1, address replacement control is performed so that an uncorrectable area (refer to as a bad area, hereinafter) is replaced with a correctable area, the number of errors in which is equal to or less than the maximum value to be correctable by ECC circuit 2. Host device 3 accesses the file memory 1 under the above-described address-replacement control, which is performed by memory controller 4.

Memory controller 4 has a function for monitoring the non-correctable signal NC, and generates a "substitutive area address" in place of an "uncorrectable area address" (i.e., "bad area address"). For this purpose, it has content addressable memory (CAM) 5 and address generating circuit 6. In this embodiment, a block serves as an access unit and an address replacement unit, so that the bad area address and the substitutive area address will be referred to as "bad block address" and "substitutive block address", respectively.

Next, the method of replacing the bad block address with the substitutive block address will be explained in detail below. To do the block address replacement, the block address generation order used in case of accessing the file memory 1 and that of the substitutive block addresses are set to be reversed to each other. That is, under the condition that the block addresses in the file memory 1 are serially arranged from "0" (BLK0) to "n" (BLKn) as shown in FIG. 1, bad block searching test is performed in order of the block addresses assigned to the memory area while the substitutive block addresses are generated in order from the last block address "n" when the bad block addresses are detected. Note here that it is not always necessary to make the address progressing directions reversed to each other. That is, the progressing of the substitutive block addresses is selected in such a manner as to avoid address collision at least at the beginning of the address progressing of the memory device. As the most simple address generation method, in the embodiment described here, the address progressing direction of the substitutive block addresses is selected to be reversed to that of the memory device as described above.

In FIG. 1, the direction of the bad block searching test (from BLK0 to BLKn) and the generation order of the substitutive block addresses (from BLKn to BLK0) are shown by arrows "test direction" and "replace direction", respectively.

In detail, predetermined data are previously written in the memory blocks of the file memory 1 from the external, and the data are read out in a test access mode. At this time, it is monitored whether the non-correctable signal NC is generated or not from the ECC circuit 2.

At this memory access, block addresses are generated by CPU 3 in serial from "0" to "n" and sent to CAM 5 in the memory controller 4 for serving as key addresses of CAM 5. When there is not a content data corresponding to a key address, CAM 5 outputs the key address as it is as block address BA_c, while there is a content data corresponding to the key address, the content data will be output as block address BA_c. At an initial block test time, there are no content data in CAM 5 because there has not yet been detected a block defect.

If data selected by block address BA_c, which is supplied to ECC circuit2, contains error bits that are correctable in ECC circuit 2, this ECC system functions effectively, so that CPU 3 generates the following, serial-ordered address. By contrast, if the detected error bits are not correctable, non-correctable signal NC will be generated. In receipt of this signal NC, address generating circuit 6, which is formed to generate internal addresses in order from the final block address "n", generates address "p-1" as block address BA_g when the current internal address is "p".

This block address BA_g is sent to CAM 5 and memory 1. In CAM 5, by use of the stored address in CPU 3 with non-correctable signal NC as a key address, the content data will be over-written by block address BA_g while block access is performed in memory 1 with the block address BA_g as a substitutive block address.

If error bits in an accessed block are less than a predetermined correctable value, there is not generated the non-correctable signal NC because the ECC system functions effectively, and CPU 3 will generate the following address. If the following block contains uncorrectable error bits, non-correctable signal NC is generated again, and new substitutive block address is generated from the address generating circuit 6. As described above, the same test cycles will be repeated.

In a state where all bad block addresses have been replaced, the previous address of the internal address of the address generating circuit 6, i.e., the last accessed address "p", becomes an effective storage capacity of the memory 1. In the example shown in FIG. 1, there are detected eleven bad blocks in the test, in which memory 1 is serially accessed from BLK0, and eleven blocks selected in order from the final block BLKn are set as substitutive blocks. In this case, the file memory 1 will be reduced in capacity by eleven blocks in comparison with a case where the whole memory areas are normal.

The replacement of the substitutive block addresses replaced with the bad block addresses defined in the bad block searching test will be stored in a non-volatile manner as described later. Therefore, the above-described bad block searching test is not necessary to be performed for the whole blocks at a time. That is, when accessing is performed first for a certain memory area, let this area to be subjected to the test read, and the substitutive block address(es) will be obtained.

After the bad block addresses which are uncorrectable by ECC circuit 2 are replaced with the substitutive block addresses with CAM 5, CPU 3 is able to deal with the file memory 1 as a good memory without bad cells. In case an uncorrectable error is generated later in a busy block, make the address generating circuit 6 function at the time, and a new block address may be assigned to the detected uncorrectable block. As a result, the bad block will be kept out of sight. In this case, the effective capacity of the memory is reduced by the bad block address. If the currently selected address in the address generating circuit 6 is "p", it designates the effective capacity of the file memory 1.

It is required of CAM 5 and address generating circuit 6 to keep the states in a non-volatile manner when the power supply is off. The reason is as follows: the contents of CAM 5 are material data for making the file memory 1 to be dealt as a memory without bad blocks; and the contents of address generating circuit 6 designate the effective capacity of the memory and serve for generating a new substitutive block address when a new bad block is generated.

To achieve the above-described functions, in the memory controller 5, CAM 5 itself is formed as a non-volatile memory, and the last write data of CAM 5 will be written in the address generating circuit 5 as initial load data, thereby resulting in that the initially loaded data is used as the current address of the address generating circuit 6.

Figure 2:
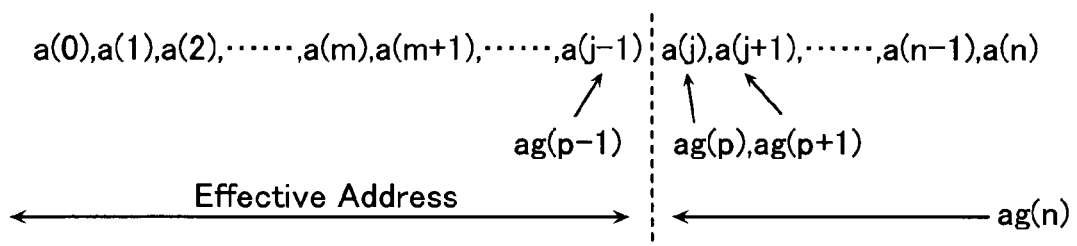
FIG. 2 shows the effective address range of the memory system.

FIG. 2 shows the relationship between the effective address range of file memory 1 and the generated address of the address generating circuit 6. The block addresses are, having no relations to whether these are physical addresses or logical addresses, lined up even if they are not related to the practical addresses. To show the relationship, the lined-up address of file memory 1 is expressed by a(m), where integer "m" designates the line-up order. By contrast, lined-up address designated by the internal address "m" of address generating circuit 6 is expressed by ag(m). Although "ag(m)" and "a(m)" are substantially the same, ag(m) is different from a(m) in a fact that address "m" progresses in the decrease direction.

Supposing that the current address variable "m" is m=p in the address generating circuit 6, the address variable range from "0" to "p-1" becomes an effective address range of the file memory 1. In FIG. 2, if ag(p)=a(j), a(0) to a(j-1) are dealt with the effective address of the file memory 1. Therefore, the effective memory capacity is defined by the current internal address value "p" generated from the address generating circuit 6. That is, address a(m) defined by m=0 to p-1 is effective as the file memory.

Figure 3:
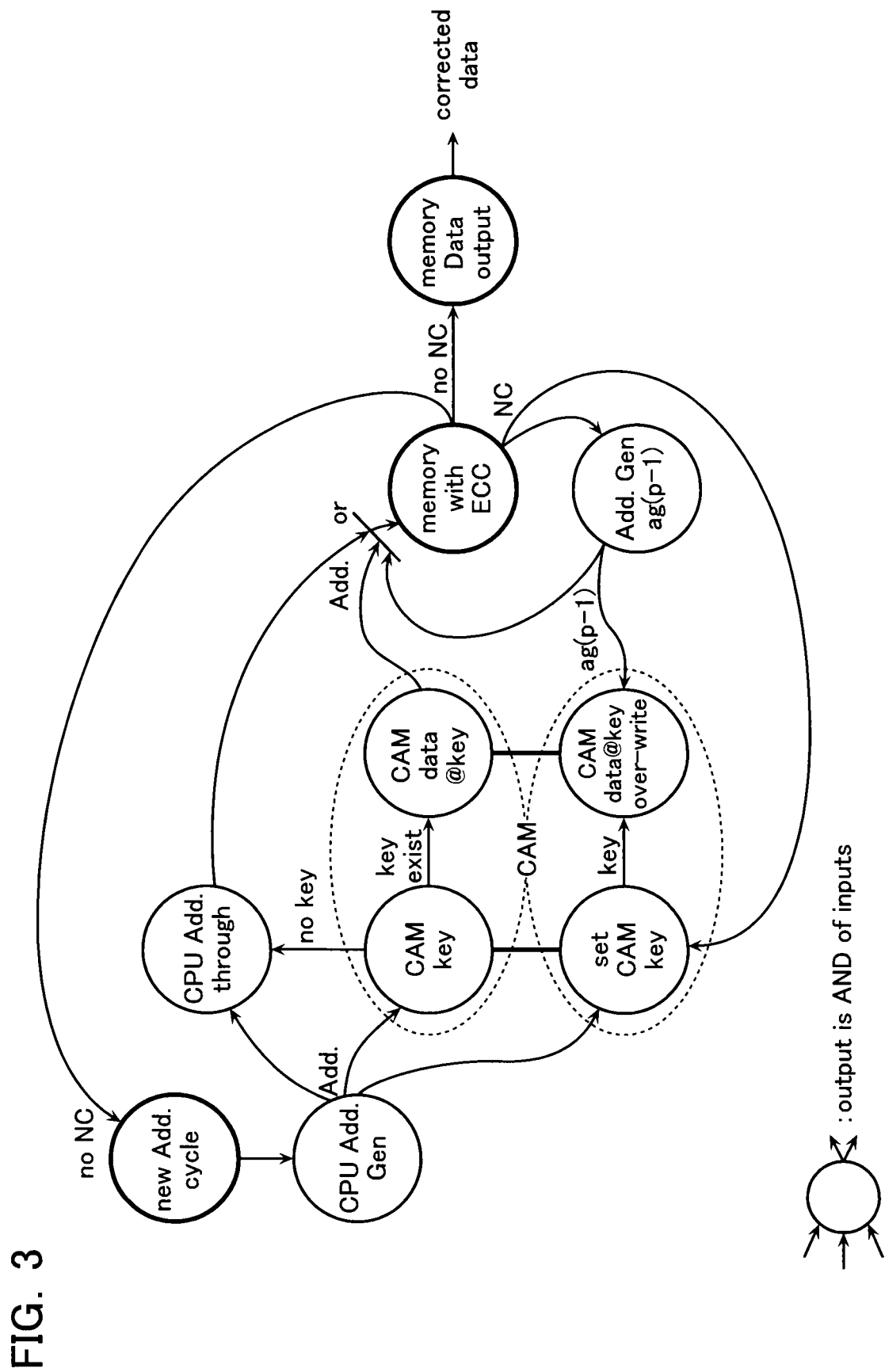
FIG. 3 is a state transition diagram of the memory system.

FIG. 3 shows a state transition diagram of the file memory system, which appears to have no error by the aid of the installed ECC system. In this state transition diagram, in case there are no specific designations, each AND logic of the input arrows decides the output state arrow. With respect to CAM part, "operation" nodes and "state" nodes are coupled to each other with direct lines, and the situations of CAM are expressed by different aspects.

The system starts from "new add. cycle" node, and state transitions are performed in accordance with the respective conditions hereinafter, so that the file memory system shown in FIG. 1 functions.

Next, it will be explained such an example that the above-described file memory has a three-dimensional (3D) cell array with variable resistance elements arranged for storing resistance values in a non-volatile manner.

[File Memory Example (1)]

Figure 4:
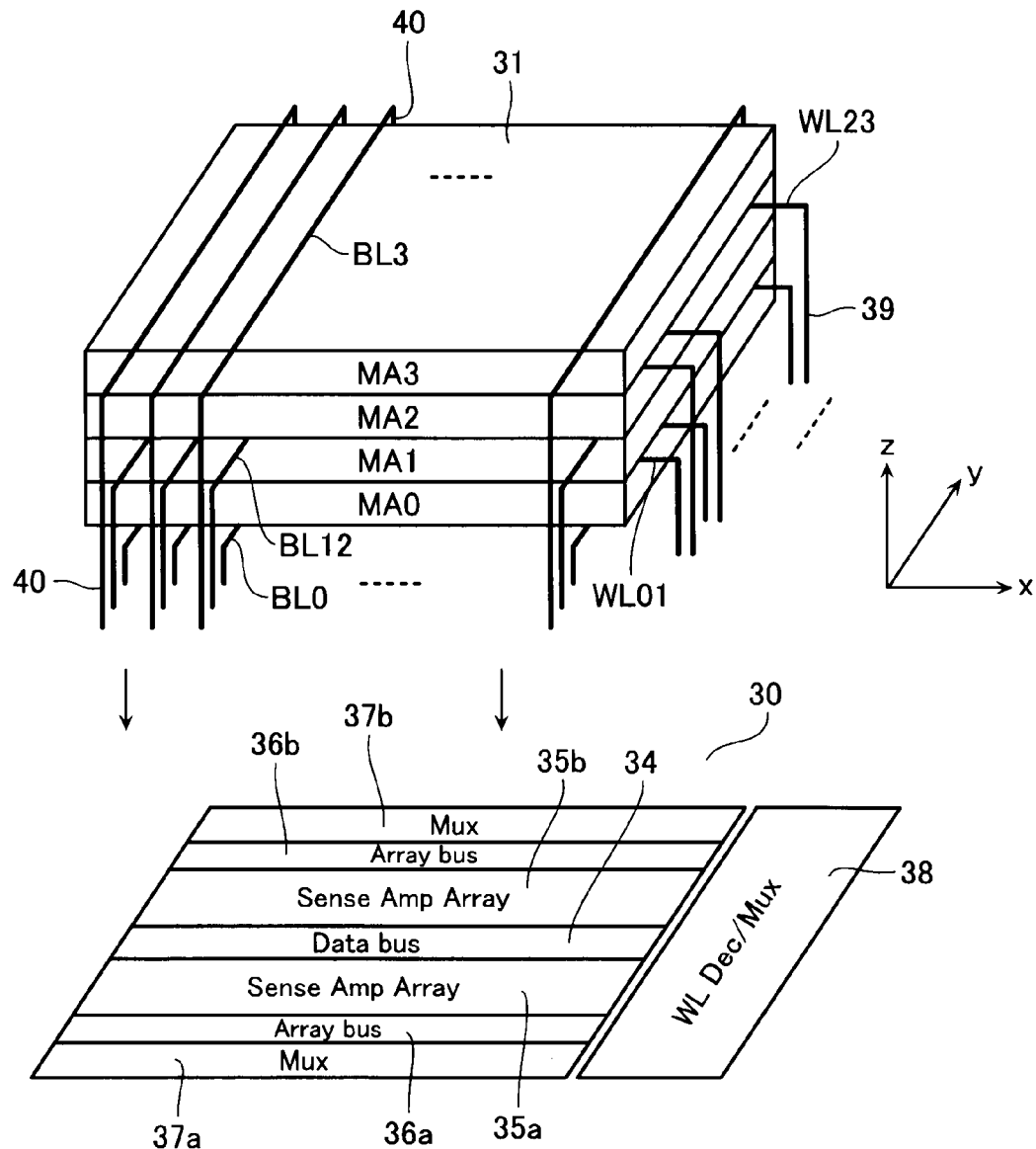
FIG. 4 shows a file memory configuration of the memory system.

FIG. 4 shows a cell array block 31, which is a unit of a 3D cell array, and read/write circuit 30 formed on a semiconductor substrate underlying the cell array block 31.

Figure 5:
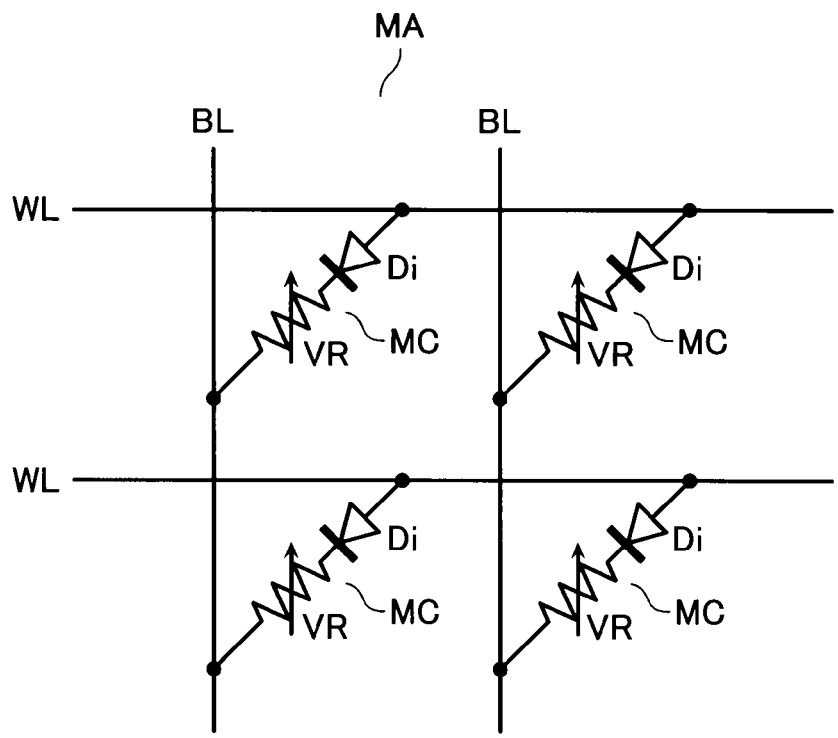
FIG. 5 shows the cell array block configuration of the file memory.

3D cell array 31 is, for example, formed of four layer cell arrays, MA0-MA3. Each cell array MA has, as shown in FIG. 5, word lines WL and bit lines BL arranged to cross each other, and memory cells MC disposed at the cross points. Memory cell MC is formed of variable resistance element VR and diode Di corrected in series.

In this example, each word line is shared by adjacent two cell arrays as follows: WL01 is a common word line of cell arrays MA0 and MA1; and WL23 is a common word line of cell arrays MA2 and MA3. With respect to bit lines BL (BL0, BL12 and BL3), BL12 is a common bit line of cell arrays MA1 and MA2.

Word lines WL elongated in "x" direction are coupled to the underlying circuit via vertical via-wirings 39 disposed on one end side of word lines while bit lines BL elongated in "y" direction are coupled to the underlying circuit alternately via vertical via-wirings 40 disposed on the both end sides of bit lines. In case the cell array block is formed in such a scheme that memory cells are selected at respective cross-points of bit lines and word lines, it is required of the vertical via-wirings to be disposed on the three sides of the cell array block, and the via-wirings are arranged with a minimum wiring pitch to be coupled to the underlying circuit. Therefore, it becomes difficult for the read/write circuit 30 to do data transmitting/receiving between the external and itself.

In consideration of this situation, the layout of read/write circuit 30 will be expressed substantially as shown in FIG. 4. Disposed at the center portion of the shadow of cell array block 31 is a data bus 34, which is elongated in parallel with word lines and serves for transferring sense data outside of the cell array block. Sense amp arrays 35a and 35b are arranged on the both sides of the data bus 34 so as to sandwich it.

Array buses 36a and 36b are disposed opposite with the sense amp arrays 35a and 35b, respectively, so as to be opposed to the data bus 34. Bit line data are transferred to the sense amp arrays 35a and 35b via the array buses 36a and 36b, respectively. Explaining in detail, bit lines drawn from the cell array block 31 are selected by multiplexers (MUXs) 37a and 37b and coupled to the array buses 36a and 36b. MUXs 37a and 37b are select circuits for coupling the bit lines arranged at the minimum pitch to the array buses 36a and 36b.

Disposed on one end portion of the data bus 34 is word line decoder 38, and there are vertical via-wirings of the word lines here arranged at the minimum pitch. Therefore, data lines are not drawn to/from the external through the side of the word line decoder area, but these are drawn through the reverse side.

Figure 7:
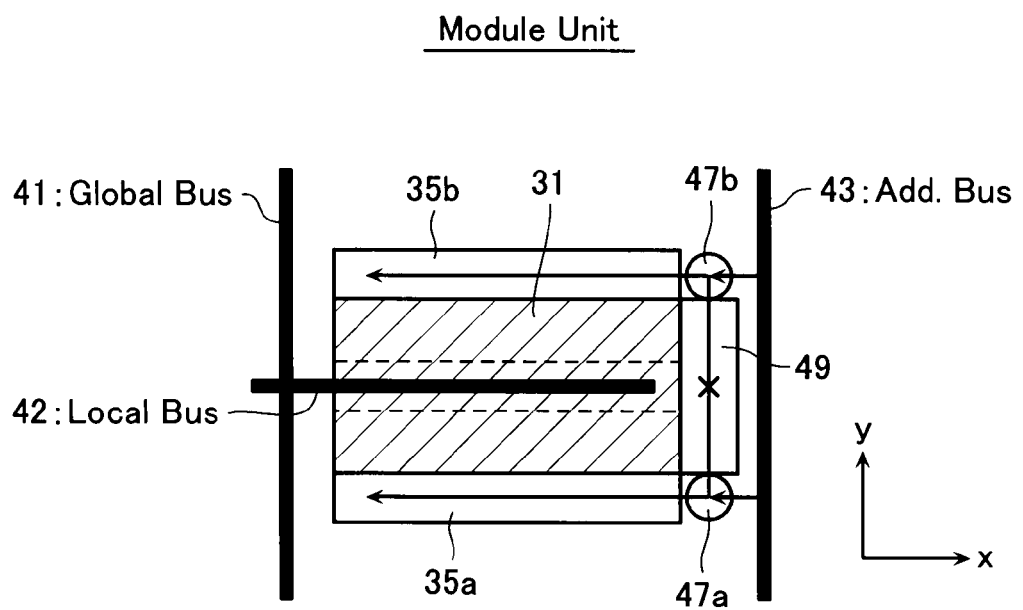
FIG. 7 shows a module unit in the layout.
Figure 6:
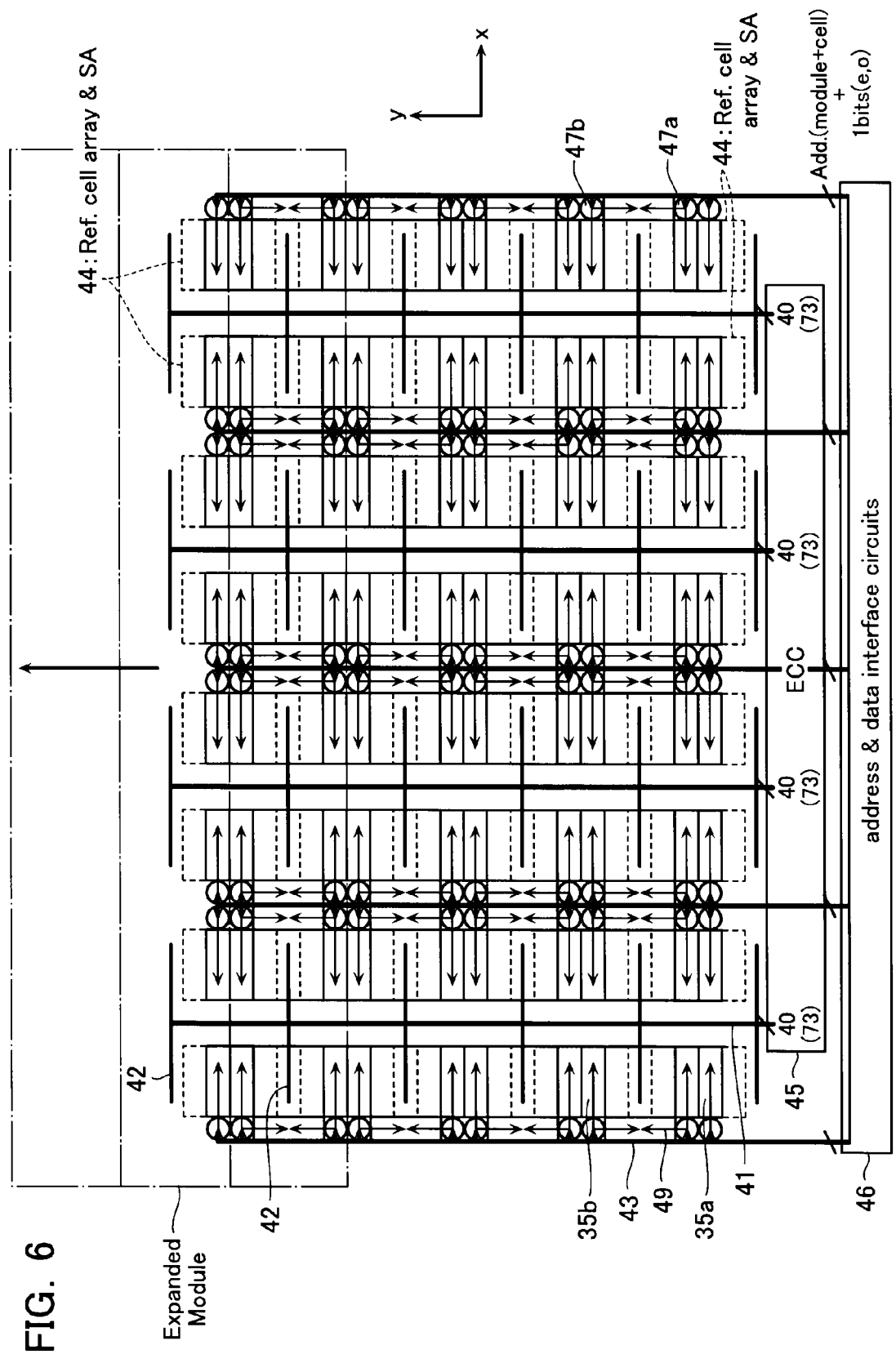
FIG. 6 shows a layout example of the cell array block configuration.

FIG. 6 shows a schematic layout of the ECC-installed file memory, in which minimum units defined by the cell array block 31 and the read/write circuit 30 shown in FIG. 4 are arranged, and FIG. 7 shows a module unit of the file memory. It should be noted here that cell array block 31 may be, for example, in correspondence to a block serving as an access unit of the file memory 1 explained in FIG. 1.

It is supposed here that ECC system 45 is formed as 4-bit error correctable one with BCH code of Galois field GF(256) or GF(512), but the system is not limited to this. Size ratios of the respective areas are not shown as being reflected by practical ones, but shown only schematically.

Vertical via-wirings are disposed on three sides of the cell array block 31 for drawing bit lines and word line to the underlying circuit, and the remaining one side becomes a window of data input/output between the sense amplifier circuit and the external. Local bus 42 is divided from global bus 41 to be disposed through the window, and it becomes data bus 34 in the cell block explained with reference to FIG. 4. The global bus 41 will be configured to be dependent on the configuration of ECC system 45.

In FIG. 6, there are shown two type of data transferring examples as follows: one example is for transferring 160 bits simultaneously with 8×4 check bits contained in case 4-bit random error correction within 128 bits may be performed with GF(256); and the other example is for transferring 292 bits simultaneously with 9×4 check bits contained in case 4-bit random error correction within 256 bits may be performed with GF(512). Since this memory system has four global buses 41, 40 bits and 73 bits are assigned to each global bus in the respective examples.

One column of cell array blocks, in which 8 cell array blocks are arranged laterally, is referred to as an expanded module as shown by a dotted line. In an expanded module, four cell array blocks are accessed simultaneously for the respective (four) global buses 41, and data thereof are output to the global buses 41. Address buses 43 are disposed on the other side of the cell array blocks to be opposed to the global buses 41 as being extended from address/data interface circuit 46. In accordance with address signals on these address buses 43, decoders in the respective module units of FIG. 7 (i.e., cell array blocks 31) will be activated.

Address data on the address bus 43 contains module unit selection bits, cell selection bits and sense amp (even or odd) selection bit. Disposed at the both ends in "y" direction of the cell array block array are reference cell array/sense amp circuits 44. Address switch circuits 47a and 47b disposed at the respective corners of cell array blocks 31 serve for taking the address signal on the address bus 43 in the cell array blocks 31.

If necessary, it is possible to arrange additional expanded modules in accordance with a desired capacity of the file memory. Therefore, it is easy to expand the file memory system.

[File Memory Example (2)]

Figure 8:
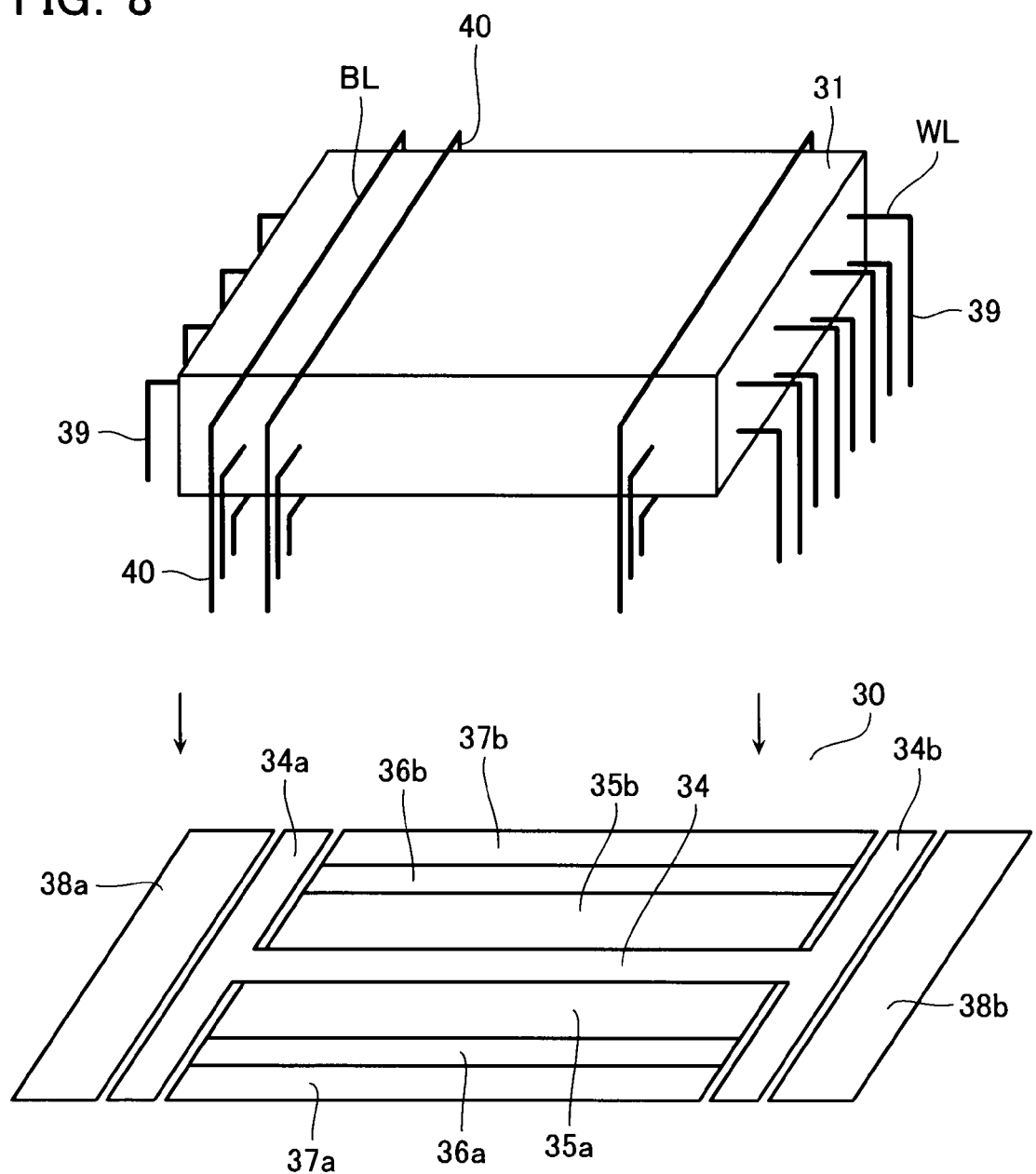
FIG. 8 shows another cell array block configuration.

FIG. 8 shows another example of the cell array block 31, in which the configuration of the vertical via-wirings and the layout of the data bus in the underlying circuit are different from those shown in FIG. 4. In this example, the whole four sides of the cell array block 41 serve as vertical via-wiring areas for bit lines and word lines. That is, vertical via-wirings 39 are disposed on two sides on the both ends of the word lines for coupling the word lines alternately to the underlying circuit. Similarly, vertical via-wirings 40 are disposed on two sides on the both ends of the bit lines for coupling the bit lines alternately to the underlying circuit.

In this case, word line decoder/multiplexer circuits 38a and 38b are disposed on the both ends of the word lines. These decoder/multiplexer circuits 38a, 38b are disposed to leave spaces against the underlying circuit area, and the spaces are used as data buses 34a and 34b. Therefore, word lines WL are drawn to pass above the data buses 34a and 34b from the cell array block area to the decoder/multiplexer circuits 38a and 38b.

Data bus (i.e., local bus) 34, which is disposed just underlying the cell array block to be arranged in parallel with the word lines, is divided into two data buses (i.e., global buses) 34a and 34b, thereby serving for data transferring between the cell array block area and the external.

According to this configuration, not only the bit lines but also the word lines are input alternately to the both sides of cell array block 31 at intervals of two word lines, so that it becomes possible to set the pitch of the vertical via-wirings 39 to be twice the minimum pitch. Further, since the wiring layout is symmetric, not only circuit portions are easily set to be equal in property, but also the circuit layout becomes compact. Additionally, in the lithography step, the exposure condition may be effectively set at a device minimum feature size. As describe above, there are many merits.

Figure 9:
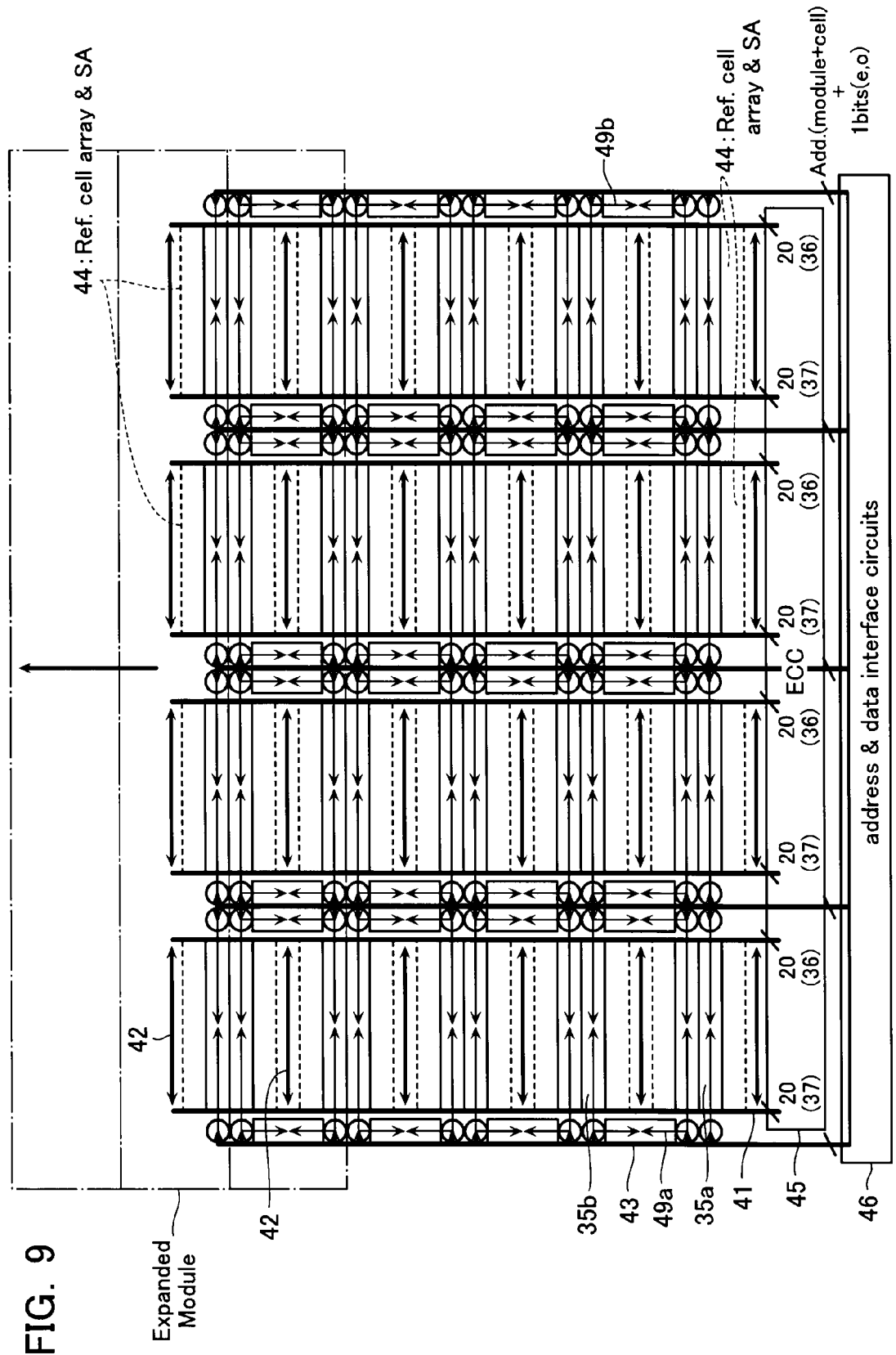
FIG. 9 shows a layout example of the cell array block configuration.
Figure 10:
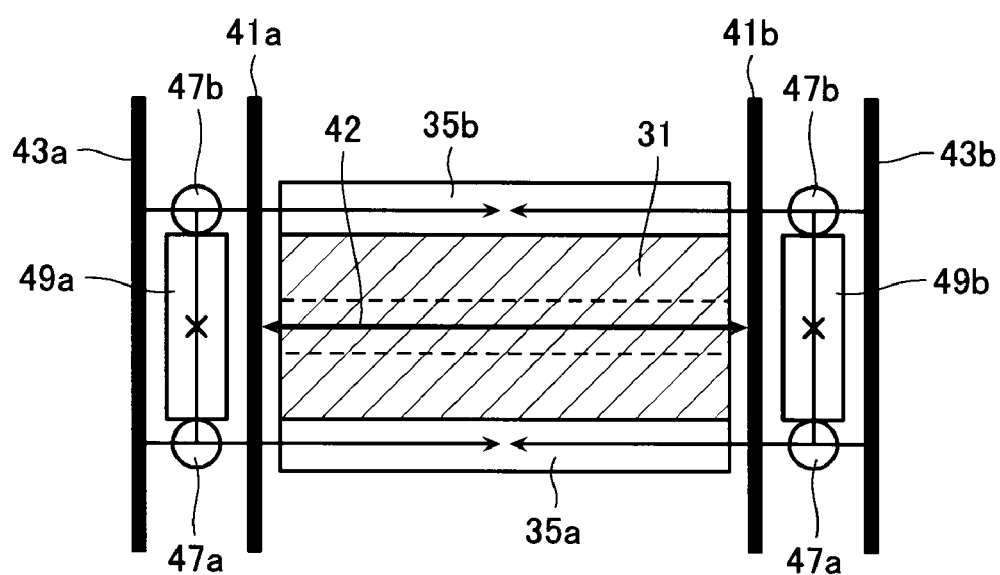
FIG. 10 shows a module unit in the layout shown in FIG. 9.

FIG. 9 shows a schematic layout of the ECC-installed file memory using the cell array block and read/write circuit shown in FIG. 8 as a minimum unit, and FIG. 10 shows the configuration of the module unit.

It is also supposed here that the ECC system is of 4-bit error correctable BCH code by use of GF(256) or GF(512). However, the ECC system is not limited to it. Size ratios of the respective areas are not shown as being reflected by practical ones, but shown only schematically.

Disposed on four sides of the cell array block 31 are vertical via-wirings for drawing word lines and bit lines, and two sides thereof serve as windows for transferring bit line data to the sense amp array. Local bus 42 coupled to these windows serves as the above-described data bus 34 just underlying the cell array block 31.

In FIG. 9, there are shown two type of data transferring examples as follows: one example is for transferring 160 bits simultaneously with 8×4 check bits contained in case 4-bit random error correction within 128 bits may be performed with GF(256); and the other example is for transferring 292 bits simultaneously with 9×4 check bits contained in case 4-bit random error correction within 256 bits may be performed with GF(512). Since this memory system has eight global buses 41, 20 bits and 36 (or 37) bits are assigned to each global bus in the respective examples.

One column of cell array blocks, in which cell array blocks are arranged laterally, is referred to as an expanded module. Cell array blocks are accessed simultaneously in such a way that at least one is selected for each global bus 41, and data thereof are output to the global buses 41. Address buses 43 are disposed in parallel with the global buses 41 as being extended from address/data interface circuit 46. In accordance with address signals on these address buses 43, decoders in the respective cell array blocks will be activated.

Address data on the address bus 43 contains module unit selection bits, cell selection bits and sense amp (even or odd) selection bit. Disposed at the both ends in "y" direction of the cell array block array are reference cell array/sense amp circuits 44.

In the following description, only the file memory example (1), in which word lines are drawn from one side of the cell array block to the underlying circuit, will be explained. Although, the circuit layout and number thereof in the file memory example (2) are different from those in the example (1), the basic thought is not different from that in the example (1).

[Reference Cell and Sense Amplifier]

Figure 11:
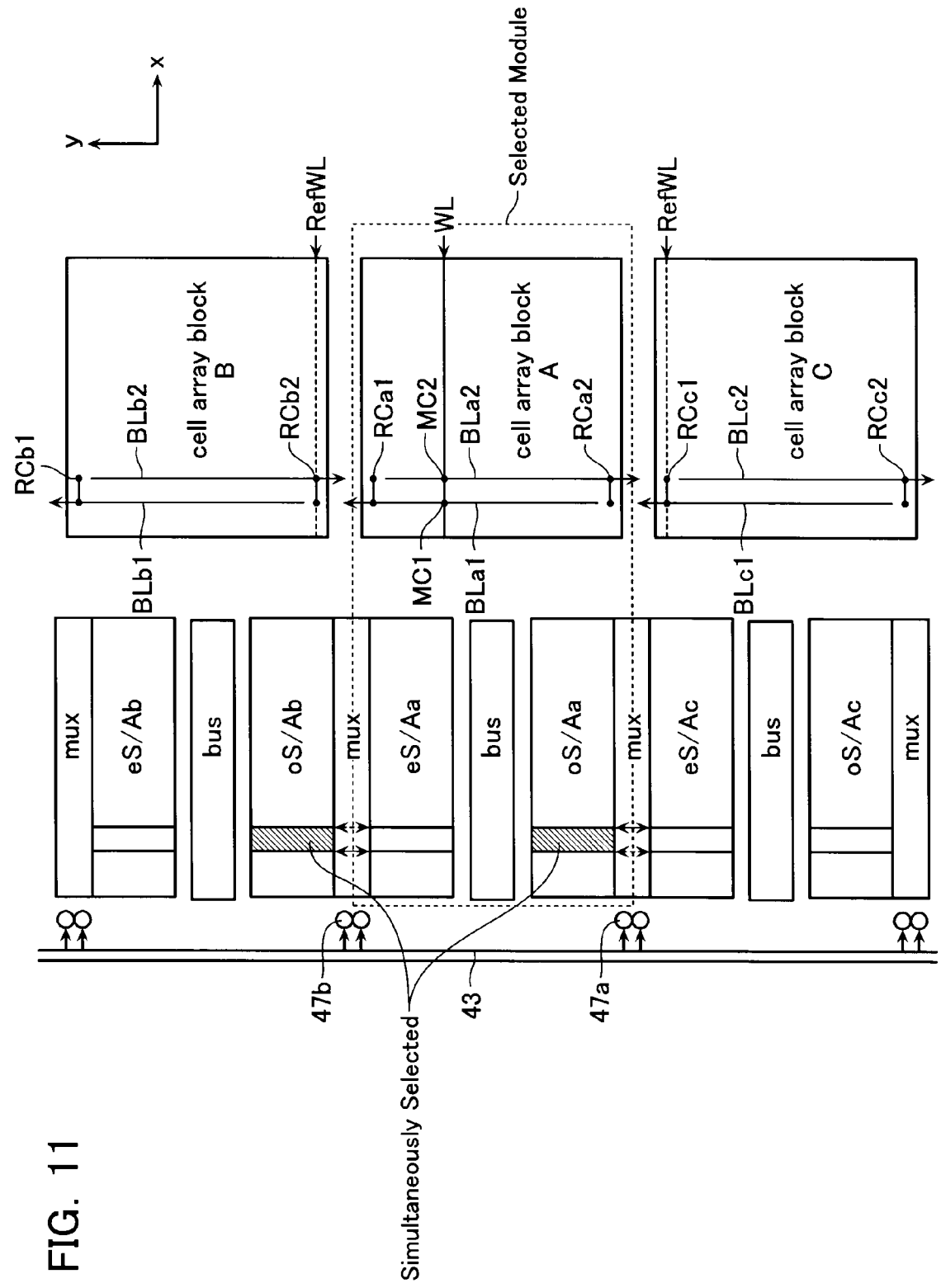
FIG. 11 shows a sense amplifier scheme with a reference cell.

With reference to FIG. 11, it will be explained the constructions of the reference cell and sense amplifier used in each cell array block in the file memory.

If one word line is selected in the 3D cell array block of the cross-point type, data will be output to all bit lines in a cell array layer. Therefore, if a reference cell is disposed on the same cell array layer as a selected cell, and a reference word line is disposed for selecting the reference cell in the cell array, multiple-selection will occur.

To avoid such a situation of the multiple-selection, it is used such a scheme that a reference cell selected in one of two cell array blocks disposed adjacent to that contains a selected cell.

Supposing that cell arrays are divided into two groups, even-numbered (e) layer group and odd-numbered (o) layer group, and common sense amplifiers used in these (e) layer group and (o) layer group are referred to as eS/A and oS/A, respectively, these sense amplifiers are arranged as shown in FIG. 11. For example, the number of layers is counted from the lowest layer as follows: the lowermost layer is defined as 0-th; and the successive layers are counted up as 1-th, 2-th, . . . .

In FIG. 11, there are shown three cell array blocks A, B and C disposed adjacent to each other. Supposing here a word line WL is selected in the central cell array block A, reference word lines RefWL in the cell array blocks B and C are selected simultaneously, which are disposed at the block edges near the cell array block A, respectively.

It is shown in FIG. 11 that two memory cells MC1 and MC2 selected by the selected word line WL are on bit lines BLa1 and BLa2 disposed adjacent to each other. One bit line BLa1, to which memory cell MC1 is coupled, has an open end on the side of cell array block C, and the other end of the side of cell array block B is coupled to the sense amp array via the vertical via-wiring. Another bit line BLa2, to which memory cell MC2 is coupled, has an open end on the side of cell array block B, and the other end of the side of cell array block C is coupled to the sense amp array via the vertical via-wiring.

Bit line BLb2, to which reference cell RCb2 selected by the reference word line RefWL in the cell array block B, and bit line BLa1 in the cell array block A constitute a pair to be coupled to a sense amplifier. Similarly, bit line BLc1, to which reference cell RCc1 selected by the reference word line RefWL in the cell array block C, and bit line BLa2 in the cell array block A constitute a pair to be coupled to another sense amplifier.

As described above, it is adapted such a open bit line scheme that a pair of bit lines are selected from two cell array blocks A and B; and another pair of bit lines are selected from two cell array blocks A and C.

According to one sense amp assignment, with respect to the above-described two pairs of bit lines, one sense amplifier eS/Aa underlying cell array block A and another sense amplifier eS/Ac underlying cell array block C and disposed on the side near cell array block A are used simultaneously within one system of sense amplifier eS/A. Alternatively, one sense amplifier oS/Aa underlying cell array block A and another sense amplifier oS/Ab underlying cell array block B and disposed on the side near cell array block A are used simultaneously within another system of sense amplifier oS/A.

Which is selected in two sense amp systems is dependent on whether the selected cells belong to the e-layer group cell array or o-layer group cell array. The reference cell is formed of multiple cells, which are disposed on the edge portions of adjacent two bit lines and coupled in parallel with each other. Here, one of two cells constituting a reference cell is isolated from the corresponding bit line, on which the one cell is arranged. Further, for example, in accordance with sense amplifier system, reference cells on the multiple bit lines are united in the MUX portion and adjusted to have a certain reference current value.

To perform the above-described word line selection and sense amp selection, address switches 47a and 47b are disposed at the corners of each cell array block to take in address information including module selection address, word line/reference word line selection address and bit line selection address. The address switch will become on when a module disposed adjacent to it is selected.

Figure 12:
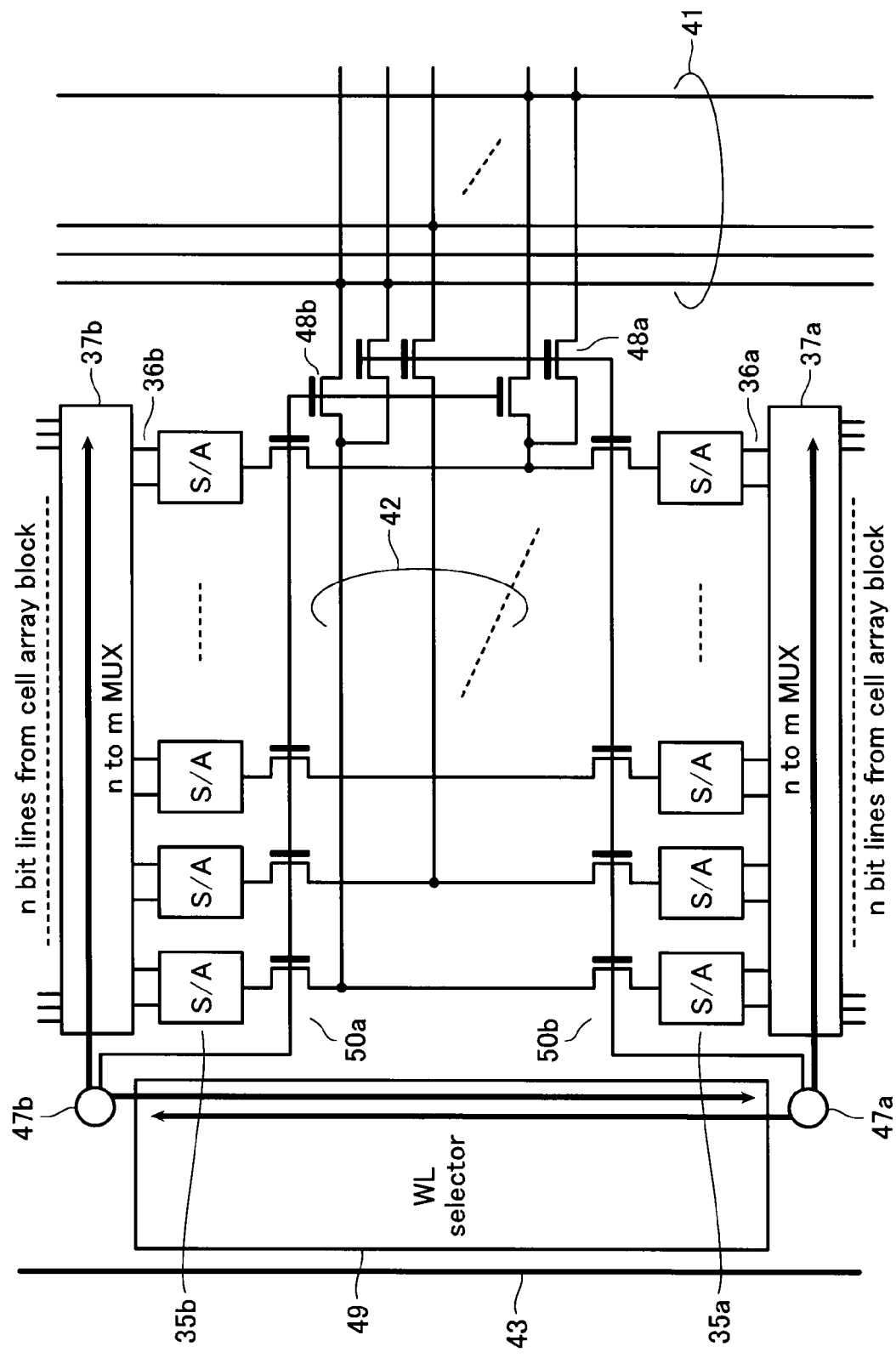
FIG. 12 shows the address bus and data transfer part underlying a cell array block.

FIG. 12 shows the circuit relationships relating address bus signal and data transferring with respect to a certain cell array block. That is, with a cell array block, there are prepared word line selector 49 (i.e., the body of word line decoder 38); multiplexers (n to m MUXs) 37a and 37b, each of which selects "n" bit lines and couple them to "m" sense amplifiers; array buses 36a and 36b for transferring bit line data to the respective sense amplifiers; and sense amplifier arrays 35a and 35b each including "m" sense amplifiers S/A.

Local bus 42 (i.e., data bus 34) is prepared to transfer m-bit data of the sense amplifier array 35a or 35b, which are disposed on the opposed sides, via select gate 50a or 50b. Further, if this cell array block is selected, the local bus 42 will be coupled to global bus 41 via select gate 48a or 48b. Select gates 48a and 48b separate the global bus 41 from the local bus 42, thereby functioning to reduce the wiring capacitance. If the wiring capacitance is not a problem, it is possible to remove the select gates 48a and 48b.

Figure 13:
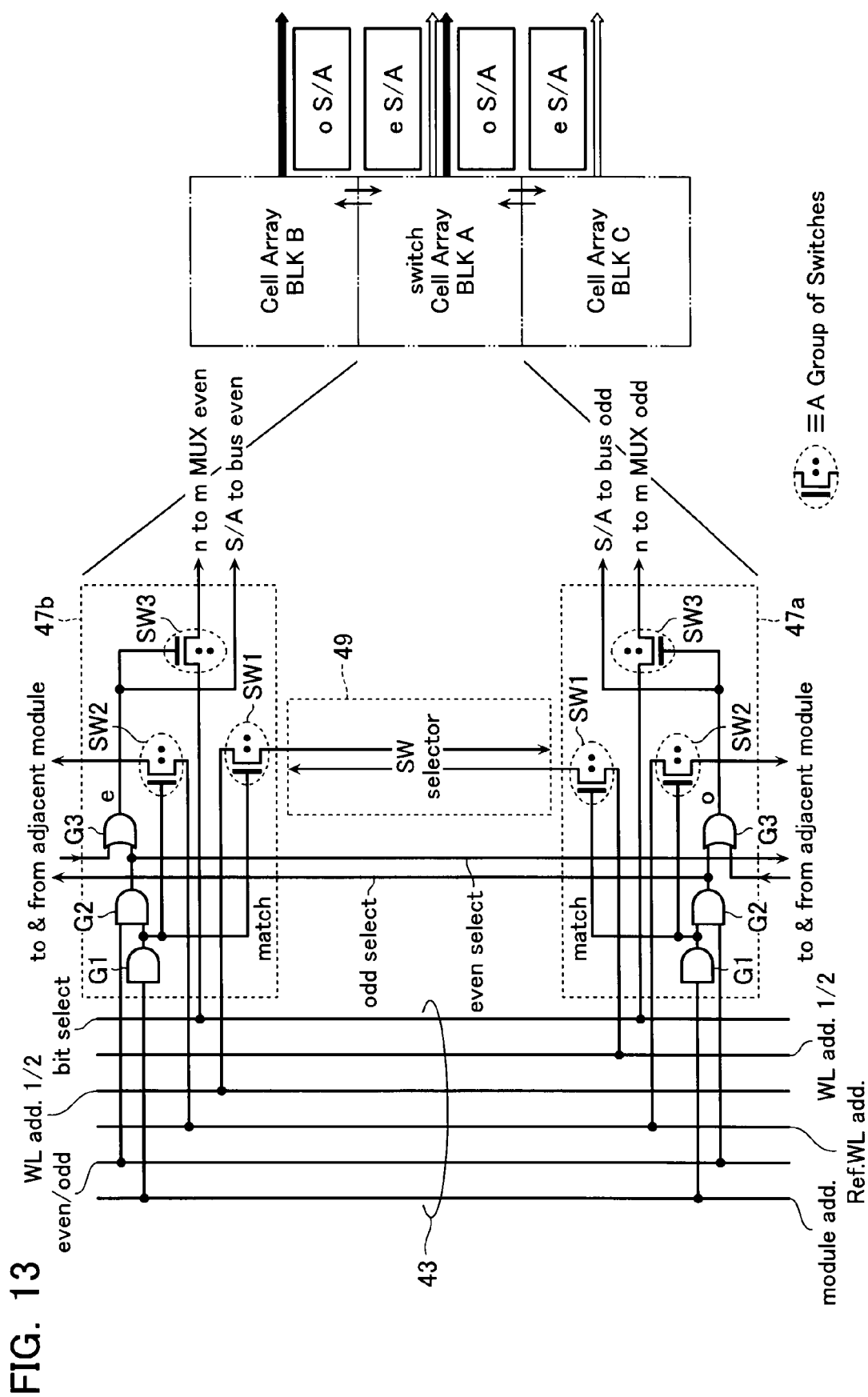
FIG. 13 shows a detailed configuration of the address bus and switch circuit part.

FIG. 13 shows a detailed configuration of the address switches 47a and 47b, noticing one cell array block.

Each of address switch circuits 47a and 47b has: switch SW1 used for supplying word line address, "WL add. 1/2", on the address bus 43 to the both sides of word line selector 49; switch SW3 and gates G1 to G3 used for supplying bit line select address, "bit select", to the bit line multiplexer 37a or 37b for coupling it to the sense amplifiers; and switch SW2 used for supplying reference word line address, "RefWL. add." in accordance with module address, "module add.".

It should be noted that each of switches SW1 to SW3 is a set of switching transistors disposed for the respective address bits.

As shown in FIG. 13, address data contained on the address bus 43 is as follows: module address "module add." for selecting a cell array block; even/odd select address "even/odd" for selecting one of even sense amplifier eS/A and odd sense amplifier oS/A; reference word line address "RefWL add." used for adjusting the reference cell current value and for deciding the number of reference word lines to be activated simultaneously; word line select address "WL add. 1/2" selected by the word line selector 49 to be input to the both side of it; and bit line select address "bit select" used in the bit line multiplexer for selecting the connection between the sense amplifier array and the bit lines.

As shown on the right side in FIG. 13, when an even sense amp eS/A is selected for the cell array block A, another even sense amp eS/A is selected simultaneously for the cell array block C. By contrast, when an odd sense amp oS/A is selected for the cell array block A, another odd sense amp oS/A is selected simultaneously for the cell array block B. To achieve this selection, the control signals of the switch circuits 47a and 47b are sent to the switch circuits in the adjacent module.

It will be explained in detail below with respect to the respect address signals on the address bus 43. Module address "module add." is constituted as several bit data for selecting an expanded module. In case bit pattern matching is detected in a module, switch circuits in the module are activated. That is, the bit pattern matching is detected by AND gate G1, and switch circuits 47a and 47b on the both side of the cell array are selected to generate a detection signal "match". In receipt of this signal "match", switches SW1 and SW2 are selected, so that word line and reference word line address data will be taken in.

Even/odd address "even/odd" is for selecting even-layer use sense amp eS/A or odd-layer use sense amp oS/A. Gate G2 takes AND logic between match signal "match" and even/odd signal "even/odd" to output odd-select signal "odd select" or even-select signal "even select". These signals "odd select" and "even select" are also input to the respective switch circuits in the upper side and the lower side adjacent cell array blocks, respectively.

When select signal "even select" rises, select signal "e" rises in the switch circuit 47b for selecting even sense amp eS/A in the selected cell array block A. This signal "e" serves as signal "S/A to bus even" (for coupling eS/A to data bus), and serves for turning on the switch SW3, which transfers address signal "bit select" serving as selection signal "n to m MUX even" (for coupling bit lines to sense amp). There is prepared OR gate G3, which also generates signal "e" and serves for raising the cell array block A with "even select" signal generated in the cell array block B disposed on the upper side of the cell array block A.

When select signal "odd select" rises, select signal "o" rises in the switch circuit 47a for selecting odd sense amp oS/A in the selected cell array block A. This signal "o" serves as signal "S/A to bus odd" (for coupling oS/A to data bus), and serves for turning on the switch SW3, which transfers address signal "bit select" serving as selection signal "n to m MUX odd" (for coupling bit lines to sense amp). There is prepared OR gate G3, which also generates signal "o" and serves for raising the cell array block A with "odd select" signal generated in the cell array block C disposed on the lower side of the cell array block A.

Reference word line address "RefWL add." is for designating that how many word lines are to be raised as a reference word line in the neighboring cell array block disposed adjacent to the selected cell array block. In detail, this raises the reference word line in the neighboring cell array block on the side near the selected cell array block A without regard to even/odd sense amp. Therefore, it will be sent to the reference word line selecting portion of the word line selector in the both neighboring cell array blocks via gate switch SW2.

Two word line addresses "WL add. 1/2" are collected to be constituted to the whole address bits used for selecting one word line. These signals also are not related to whether the sense amp is even or odd, so that these are input to the both ends of the word line selector via switch SW1 driven by the matching detect signal "match", and decoded to select one word line.

Bit line selection address "bit select" contains information bits used for selectively coupling "n" bit lines to "m" sense amps. This will be sent to multiplexer (n to m MUX) 37 on the eS/A or oS/A side as multiplexer selection signal "n to m MUX even" or "n to m MUX odd" via switch SW3 driven by select signal "e" or "o", and decoded.

Figure 14:
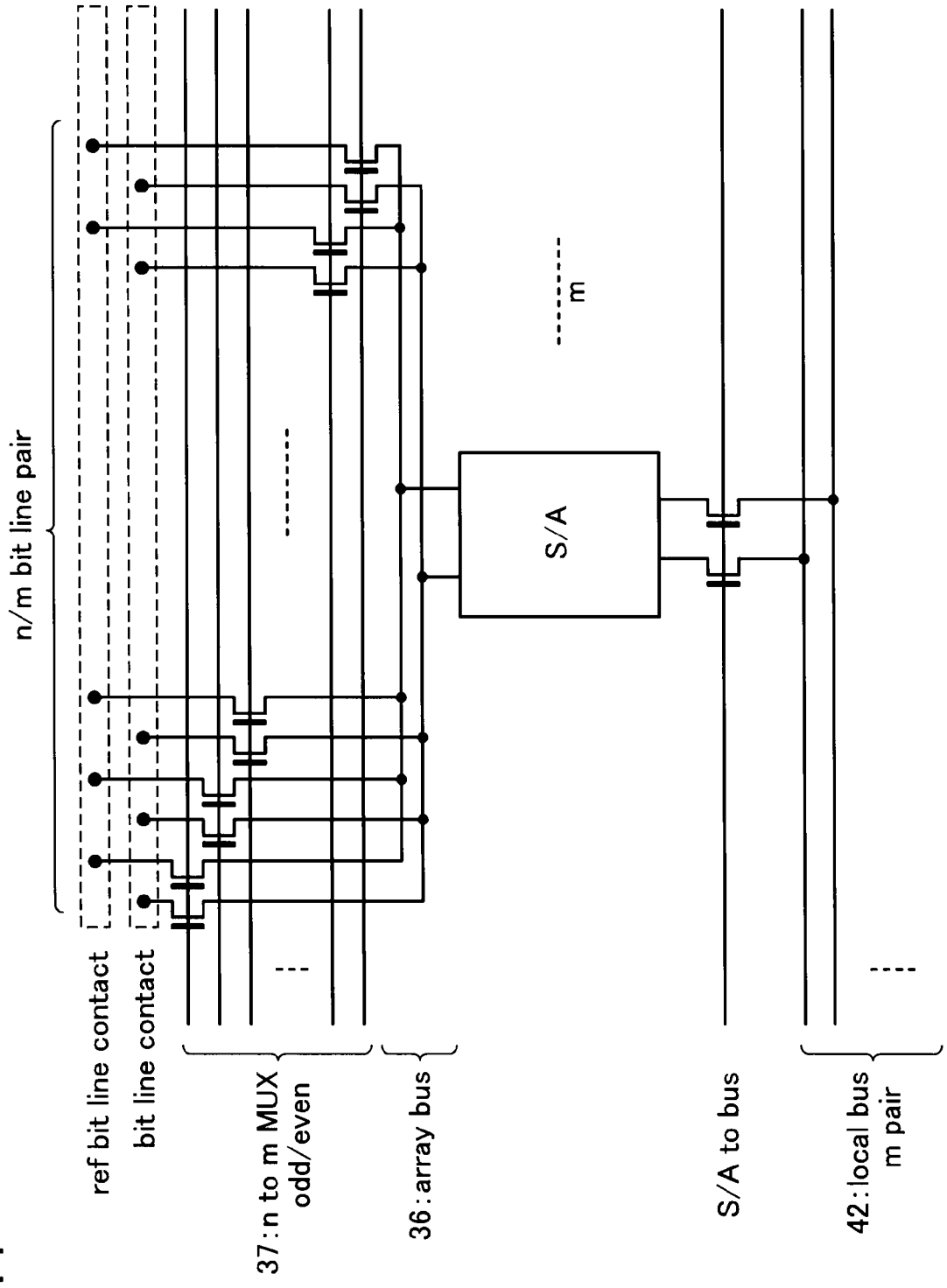
FIG. 14 shows the periphery of the sense amplifier.

Referring to FIG. 14, it will be explained the coupling relationships between the bit lines, sense amps and local bus. n-bit lines drawn from one side of a cell array block and n-bit lines (reference bit lines) drawn from the other side of the adjacent cell array block constitute n-bit line pairs, and these are input to the multiplexer 37. n/m bit line pairs correspond to one sense amp, and the multiplexer 37 selects one pair in the n/m pairs and couple it to a sense amp S/A.

The signal used for the above-described selection, "n to m MUX even/odd", is finally decoded to n/m-signals, which drive the select gates of the bit line pairs, whereby data on a selected pair of bit lines is transferred to the sense amp S/A via array bus 36 with a pair of data lines. Sensed data will be transferred to local bus 42 via a select gate driven by control signal "S/A to bus".

Although FIG. 14 shows only one pair of data lines in the local bus 42, the number of pairs of data lines constituting the local bus 42 is "m" that is the same as sense amp numbers.

Figure 15:
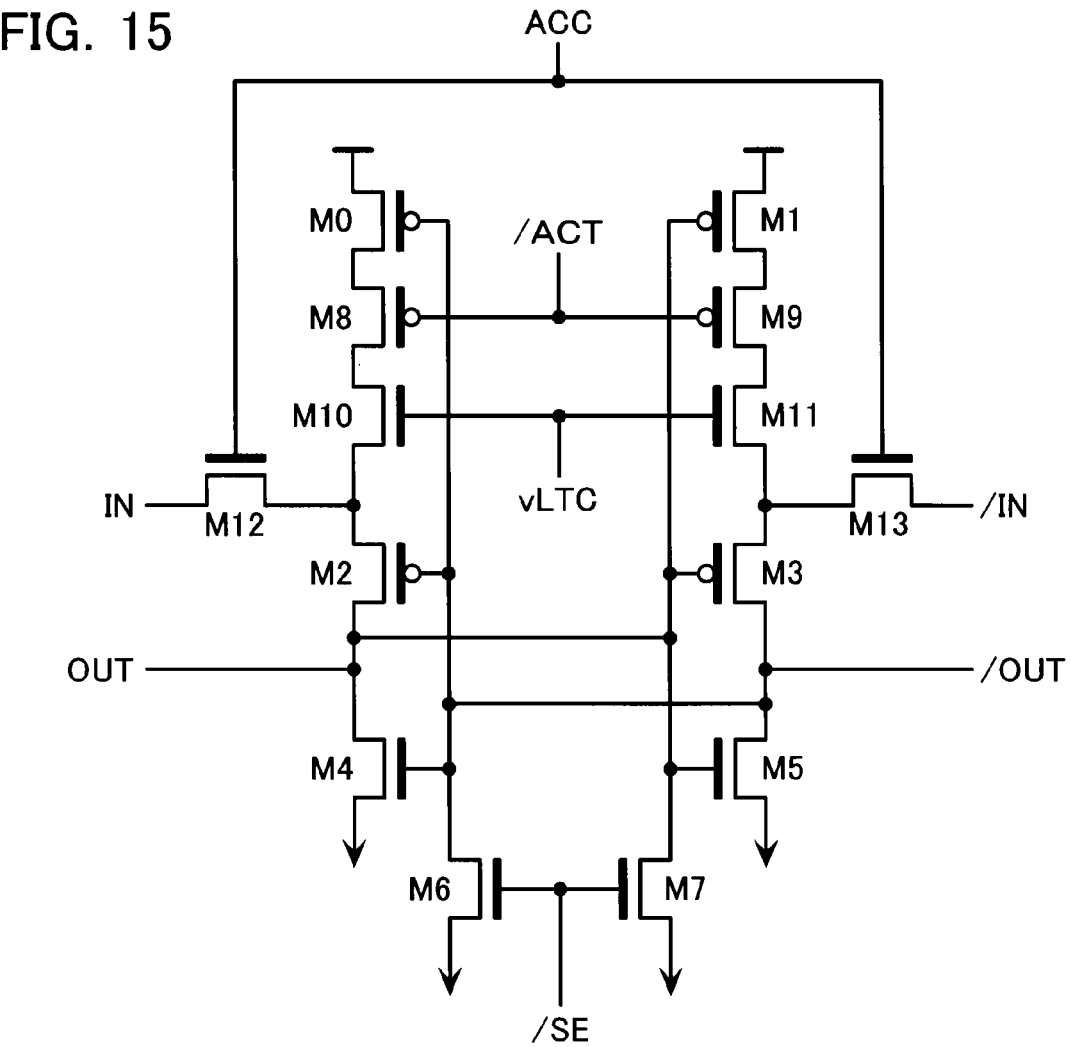
FIG. 15 shows a detailed configuration of the sense amplifier.
Figure 16:
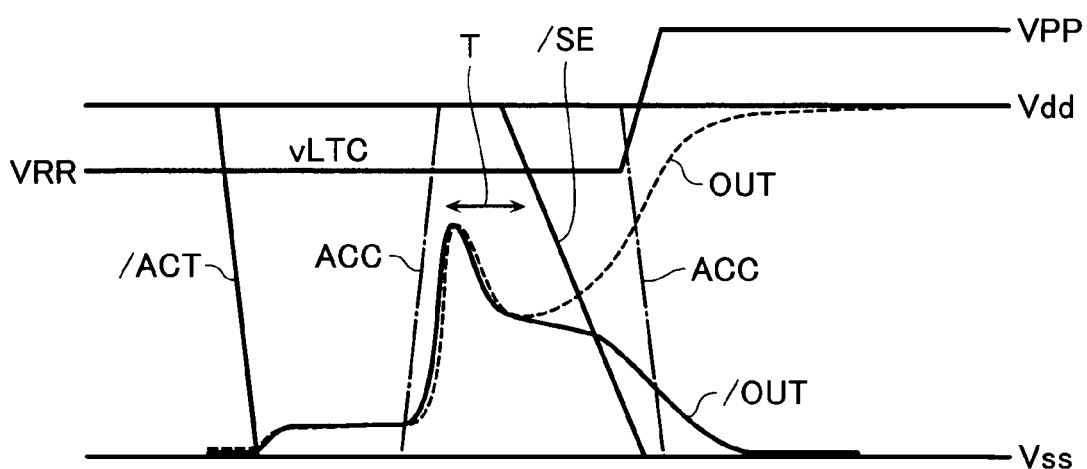
FIG. 16 shows waveforms of the sense amplifier.

FIG. 15 shows a detailed configuration of a current-type sense amplifier serving as eS/A or oS/A, and FIG. 16 shows the operation waveforms. This sense amp compares a cell current with a reference current to detect cell data defined by a cell's resistance state, and it will be formed to be able to certainly perform current comparison with a current level such as 1 µA or less at a high rate.

Basic elements of this sense amp are as follows: a CMOS inverter formed of PMOS transistors M0, M2 and an NMOS transistor M4, which have a common gate; and another CMOS inverter formed of PMOS transistors M1, M3 and an NMOS transistor M5, which have another common gate. These CMOS inverters constitute a latch circuit in such a way that these input/output nodes are cross-coupled to output nodes OUT and /OUT.

Serially Disposed between PMOS transistor M0 and PMOS transistor M2 are activation PMOS transistor M8 and current-limiting NMOS transistor M10. Similarly, activation PMOS transistor M9 and current-limiting NMOS transistor M11 are serially Disposed between PMOS transistor M1 and PMOS transistor M3.

Output nodes OUT and /OUT are coupled to Vss via NMOS transistors M4 and M5, respectively, and via NMOS transistor M7 and M6, respectively, driven by /SE. Sources of PMOS transistors M2 and M3 are coupled to input nodes IN and /IN via NMOS transistors M12 and M13, respectively, driven by ACC.

The basic operation of this sense amp is as follows. As shown in FIG. 16, when signal /SE is "H", activation signal /ACT is lowered, so that the pair of PMOS transistors M8 and M9 are turned on to make sense amp current flow. Successively, signal ACC is raised, and selected bit line's currents are supplied to the input nodes IN and /IN of the sense amp.

At this time, in accordance with the difference between an injection current carried from the selected cell and another injection current carried from the reference cell, a drain voltage difference is generated on the drains of NMOS transistors M6 and M7, each operation point of which moves from a linear characteristic region to a current saturation region. The voltage difference will be amplified by NMOS transistors M4 and M5, and latched.

That is, the cell current difference is converted to a voltage difference in such a manner that when transistors M6 and M7 are turned on with /SE, the "timing difference" of transition timings from the linear characteristic region to the current saturation region thereof becomes a "voltage difference" of these drains, and this drain voltage difference becomes a "gate voltage difference" between one common gate of M2 and M4 and the other common gate M3 and M5, thereby turning off one of PMOS transistors M0 and M1.

Setting the common gate to be low, for example VRR, at the beginning of the sense operation, the transistor pair of M10 and M11 serves for squeezing the sense amp current carried from Vdd in a low conductance state defined by the control signal vLTC. With this function, the cell current supplied via transistor pair of M12 and M13 will be reflected sufficiently on the sense amp state.

After the sense amp balance breaks definitely as a result of the initial sensing of the current difference, as shown in FIG. 16, gate signal vLTC is changed from VRR to VPP higher than Vdd so that the power supply voltage Vdd is applied to the sense amp. As a result, the output voltage fully swings to Vdd. Then the signal ACC is lowered, and the cell current supplied to the sense amp is cut off.

Since the characteristic variation of shrunk pair transistors occur due to the fluctuation of the fabrication processes, considering that the current path is formed of as many elements connected in series as possible, the variation will be effectively cancelled. Therefore, M0-M1 pair, M8-M9 pair and M10-M11 pair are inserted between the input nodes and the power supply node Vdd.

Specifically, NMOS transistor pair of M10 and M11 functions to suppress the influence of variations of PMOS transistor pairs M0-M1 and M8-M9, which form a feed back loop of the sense amp operation. That is, suppressing the conductance of NMOS transistors, the drain and source voltages of PMOS transistors are raised so that the conductance of these PMOS transistors is made to be higher. These conductance values of NMOS transistors and PMOS transistors function to suppress the influence of variations thereof.

NMOS transistor pair of M10 and M11 is driven in such a way that the gate control signal vLTC is set to be low at the beginning and high at the latter half time so that it functions to increase the amplifying function at the signal amplifying time and latch the decided data at a high speed with a high conductance after data sensing.

Time difference "T" between the rising time of signal ACC and the falling time of sense-starting signal /SE will be set suitably in such a way as to start sensing after the cell current injection, which is performed with the signal ACC raised, ends and after a certain waiting time until the cell current is reflected sufficiently to the input current.

[CAM]

Figure 17:
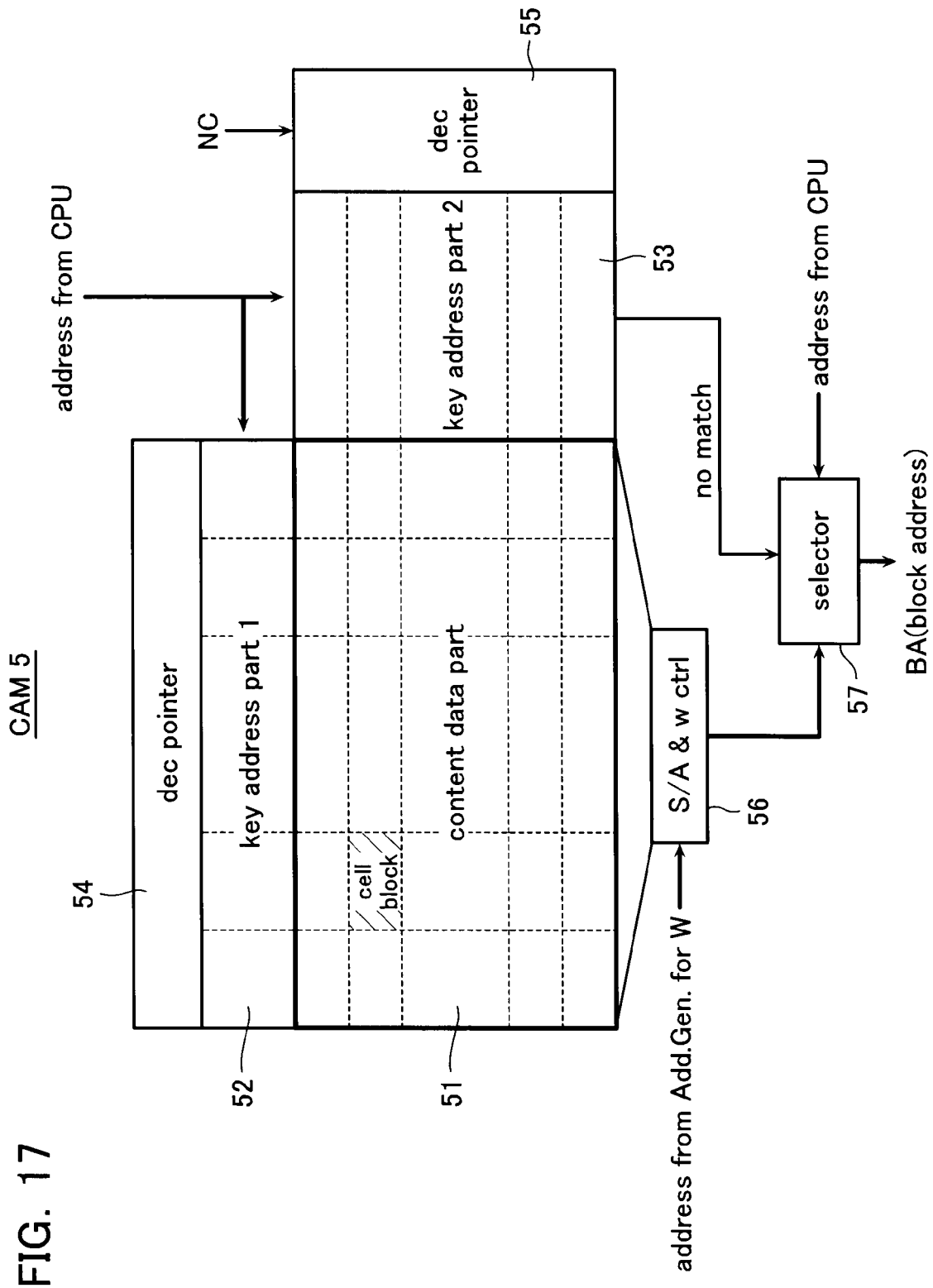
FIG. 17 shows the CAM configuration of the memory controller.

FIG. 17 shows a detailed construction example of CAM 5 in the memory controller 4. CAM 5 itself is formed as a non-volatile memory for storing cell array block addresses (i.e., substitutive block addresses to be replaced with bad block addresses) after the power supply off. In detail, the CAM includes content data part 51 used for storing the substitutive block addresses of the replacement destinations, and key address parts 52 and 53 used for storing bad block addresses as key addresses and serving for judging whether the address sent from CPU is bad or not (i.e., to be replaced or not). Key address parts 52 and 53 constitute column and row decoders, respectively, for accessing the content data part 51.

Content data part 51 is a non-volatile memory circuit formed as a cell block matrix storing the block address bits of the file memory as a whole. This is formed of non-volatile memory cells with variable resistance elements as similar to the file memory 1.

Key address part 52 is for selecting the cell block column while key address part 53 is for selecting the cell block row. Attached to these key address parts 52 and 53 are decoder pointers 54 and 55, respectively, which serve as sequential selection circuits used for initially setting-up at a data write time and a power on time.

Decoder pointers 54 and 55 are formed to carry forward pointer thereof when the non-correctable signal NC is output from the ECC system of the file memory. In detail, the method of pointer proceeding is as follows: after the pointer of key address part 54 takes a round, the pointer of key address part 55 is made to proceed.

At a data write time, an internal address generated from the address generating circuit 6 is stored in a selected cell block in content data part 51 as content data. At a read time, data of a selected cell block is read out as a substitutive block address via read/write control circuit 56 and sent to selector 57.

CAM 5 always receives the accessing addresses for the file memory generated from CPU. At a bad block checking test time, when a CPU address is a bad block address with the signal NC generated, it is stored as a key address in the key address parts 52 and 53, and a substitutive block address sent from the address generating circuit 6 is stored in the content data part 51 as a content data corresponding to the key address. At a normal accessing time of the file memory, the CPU address is sent to key address parts 54 and 55, and key address matching is detected.

When key address matching is detected, cell block data corresponding to the key address is read out as block address, BA, which is output via selector 57. When there is not detected address matching, no match signal "no match" is output, and the CPU address is output as it is as the block address BA via selector 57.

Figure 18:
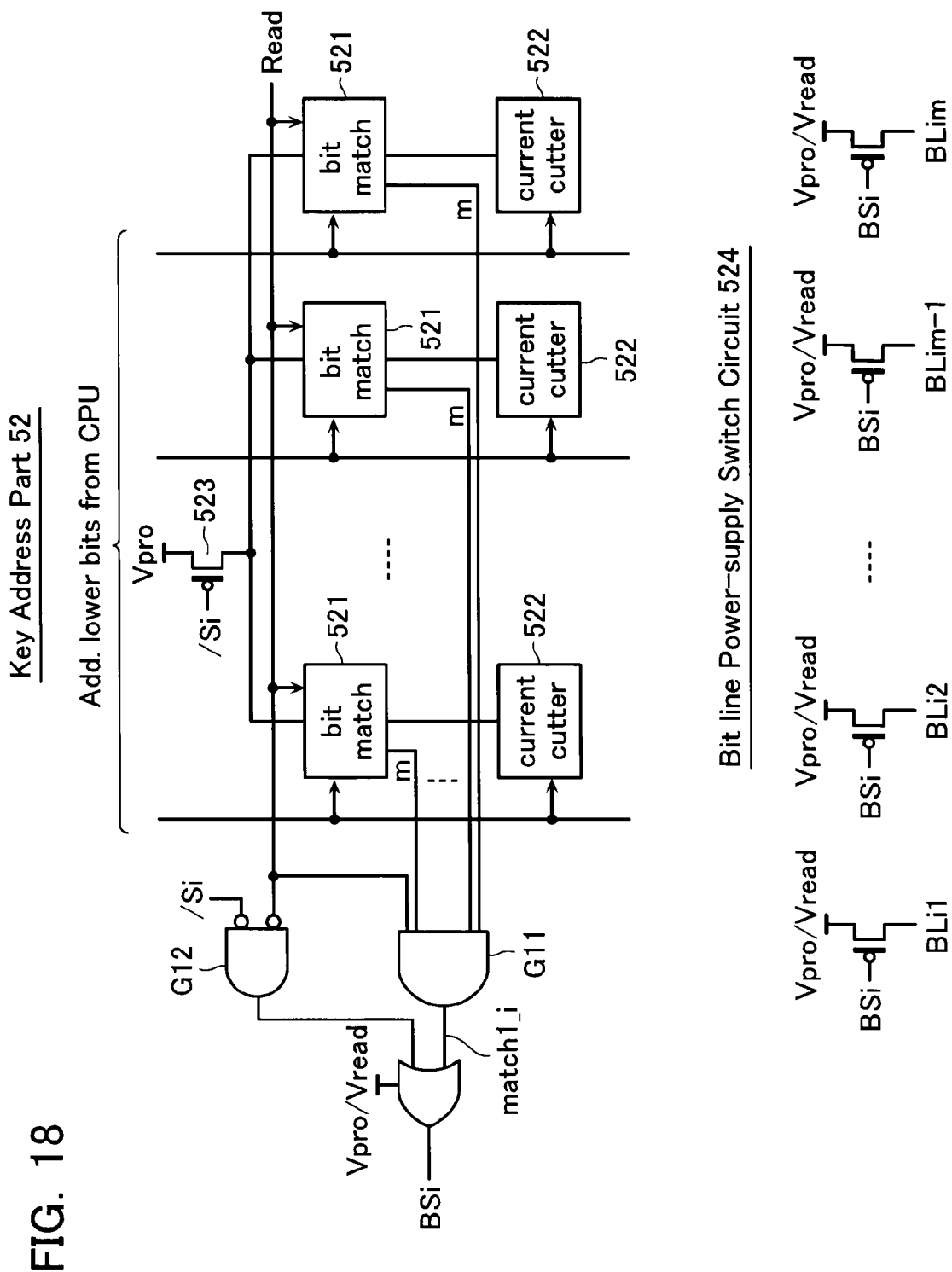
FIG. 18 shows one key address part of the CAM.

FIG. 18 shows the decoder configuration of key address part 52. Address information input to this decoder portion are partial address bits in the address data sent from CPU, for example, some lower bits. Output BSi is a column position data, which controls power supply switching circuit 524 of bit lines BLij (j=1 to m) in the non-volatile memory constituting a cell block.

That is, when BSi="H", the power supply switching circuit 524 becomes off, and bit lines are set in a floating state from the steady state where these are coupled to the power supply. The power supply level of output BSi is Vpro at a write time or Vread at a read time. These may be set at the same levels as each other when the condition is allowed.

Bit match circuits 521 are prepared for detecting match/no match between input address bits and the respective key address bits, and control signal "Read" is input to these circuits. This signal Read is "L" at a write (program) time when the key address is set, or "H" at an address match detection time when the matching between the respective input address bits and the key address bits is detected. At the write time, power supply voltage Vpro is applied from the power supply circuit 523 to the respective bit match circuits 521 selected by the signal /Si sent from the pointer.

To set suitably the resistance state of the variable resistance element when setting the bit match circuits 521, current cutter circuits 522 are coupled to the respective bit match circuits 521, to which address bits of the CPU address also are input, respectively.

When signal /Si="L" and signal Read="L", AND gate G12 outputs BSi="H" without regard to the bit match detection. That is, output BSi is selected only in accordance with the pointer, so that data write of cell blocks is made to be enable. Further, in case of matching detection with key addresses, when Read is "H" and matching is detected in the entire bit match circuits 521 (i.e., outputs "m"s are all "H"), AND gate G11 outputs match detection signal match1_i="H", and output BSi becomes "H".

Figure 19:
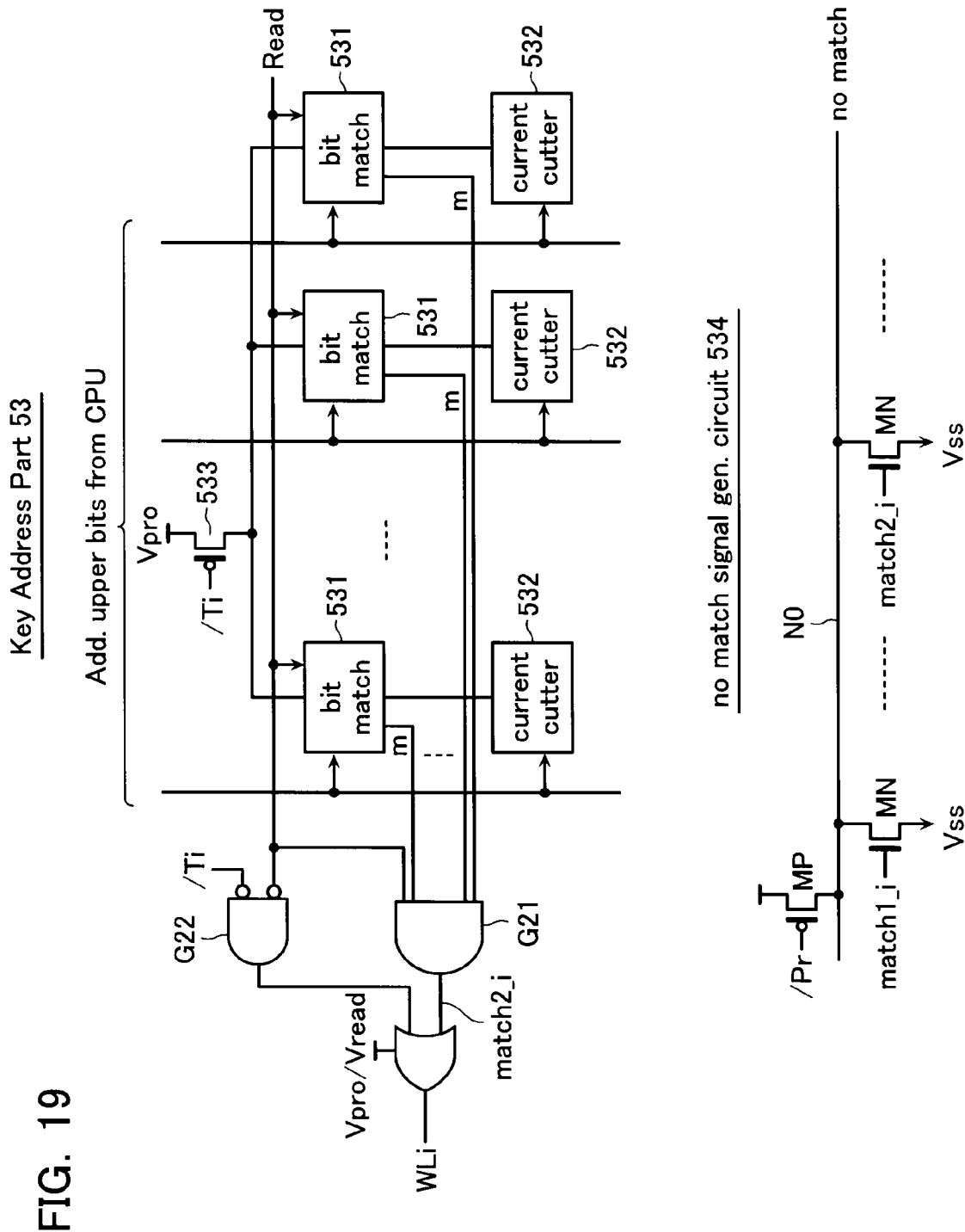
FIG. 19 shows the other key address part of the CAM.

FIG. 19 shows the decoder configuration of key address part 53. Address information input to this decoder portion are the remaining address bits in the address data sent from CPU, for example, some upper bits. Output WLi is a row position data, with which the word line WLi of the variable resistance element of the cell block is set at the power supply voltage Vpro or Vread. Vpro is used at a write time while Vread is used at a read time. These voltages may be set at the same levels as each other when the condition is permitted.

Bit match circuits 531 are prepared for detecting match/no match between input address bits and the respective key address bits, and control signal "Read" is input to these circuits. This signal Read is "L" at a write (program) time when the key address is set, or "H" at an address match detection time when the matching between the input address bits and the key address bits is detected.

At the write time, power supply voltage Vpro is applied from the power supply circuit 533 to the respective bit match circuits 531 selected by the signal /Ti sent from the pointer. To set suitably the resistance state of the variable resistance element when setting the bit match circuits 531, current cutter circuits 532 are coupled to the respective bit match circuits 533, to which address bits of the CPU address also are input, respectively.

When signal /Ti="L" and signal Read="L", AND gate G22 outputs WLi="H" without regard to the bit match detection. That is, output WLi is selected only in accordance with the pointer, so that data write of cell blocks is made to be enable.

In case of matching detection with key addresses, when Read is "H" and matching is detected in the entire bit match circuits 531 (i.e., outputs "m"s are all "H"), AND gate G21 outputs match detection signal match2_i="H", and output WLi becomes "H".

In FIG. 19, no match signal generating circuit 534 is shown, which generates signal "no match" in case no address matching is detected between CPU address and key addresses through key address parts 52 and 53. This circuit has a node N0, to which precharge PMOS transistor MP and a group of discharge NMOS transistors MN are coupled.

Node N0 precharged prior to the start of an access cycle will be discharged to be "L" when one of the entire match-detection signals match1_i and match2_i is "H". There are obtained no match-detection signals, signal "no match" becomes "H". When this signal "no match" is "H", selector 57 in CAM is controlled with this signal to directly output the CPU address as a block address.

Figure 20:
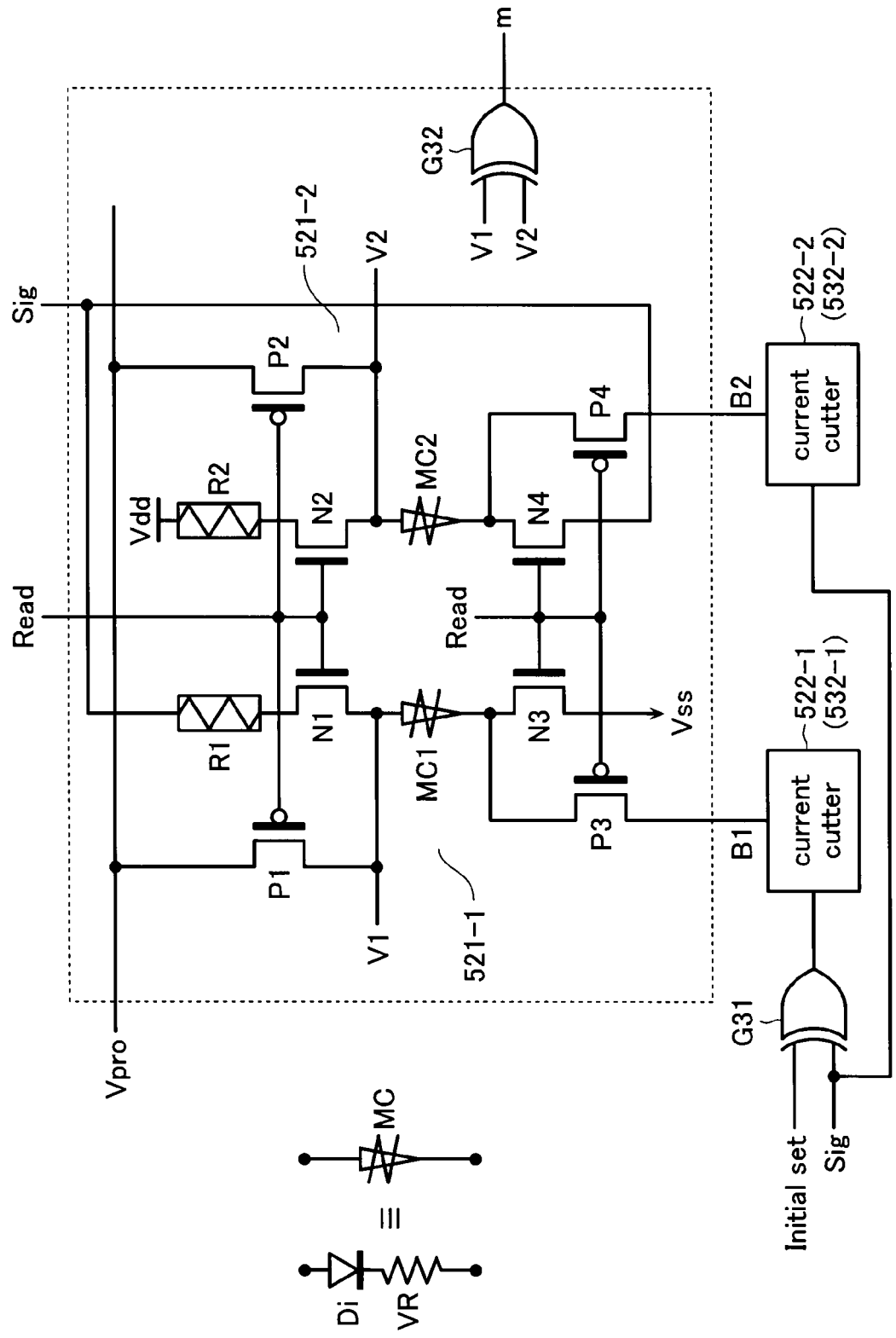
FIG. 20 shows a bit match circuit used in the key address parts.

FIG. 20 shows the detailed construction of the bit match circuit 521 (or 531). This bit match circuit has a pair of non-volatile memory cells MC1 and MC2, each of which has variable resistance element VR and diode Di. A certain data is written (programmed) in it, and when matching is detected between the program data and input bit data, it generates match signal "m".

One node V1 of one memory cell MC1 is coupled to a signal input node, to which signal "Sig" to be detected as match/no match is input, via NMOS transistor N1 driven by signal "Read" and load resistance R1 while the other node is coupled to Vss via NMOS transistor N3 driven by signal "Read". With this memory cell MC1, one non-volatile memory circuit 521-1 is constituted.

One node V2 of the other memory cell MC2 is coupled to the power supply node Vdd via NMOS transistor N2 driven by signal "Read" and load resistance R1 while the other node is coupled to the signal, "Sig", node via NMOS transistor N4 driven by signal "Read". With this memory cell MC2, the other non-volatile memory circuit 521-2 is constituted.

the nodes V1 and V2 of these memory circuits 521-1 and 521-2 also are coupled to the power supply voltage Vpro via PMOS transistors P1 and P2, the common gate of which is driven by signal "Read".

The lower course nodes of these memory cells MC1 and MC2 are also coupled to nodes B1 and B2 of the current cutter circuits 522-1 and 522-2 (or 532-1 and 532-2) via PMOS transistors P3 and P4, the common gate of which is driven by signal "Read", respectively. These current cutter circuits serve for setting the resistance value of the memory cell in accordance with current value control.

As an initial state prior to bit information programming, the pair of memory cells MC1 and MC2 is set in such a manner that MC2 is in a low resistance state; and MC1 in a high resistance state. At this time, signal "Read" is "L", and nodes V1 and V2 are isolated from load resistances R1 and R2 and applied with the power supply voltage Vpro. The remaining nodes are coupled to nodes B1 and B2 of the current cutter circuits 521-1 and 521-2.

When setting the initial state, signal "initial set" becomes "H". Therefore, in accordance with EXOR circuit G31, "H" and "L" are applied to current cutter circuits 521-1 and 521-2, respectively, with H of signal "Sig", so that the program operation is performed for setting the pair of memory cells to be in the high/low resistance state.

To program bit information, both of memory cells MC1 and MC2 are set in a high resistance state or a low resistance state. At this time, signal "Read" is set at "L", and nodes V1 and V2 are isolated from load resistances R1 and R2 and applied with the power supply voltage Vpro. The remaining nodes are coupled to nodes B1 and B2 of the current cutter circuits 521-1 and 521-2. When programming, initial set signal "initial set" becomes "L", and signal "Sig" and buffered one thereof are input to the current cutter circuits 522-1 and 522-2, respectively, in accordance with EXOR gate G31, so that the resistance values of memory cells MC1 and MC2 are set in high and high (or low and low) resistance states, respectively, in accordance with information "Sig".

In case of match detecting, signal "Read" is set to be "H". At this time, node N1 of the memory circuit 521-1 becomes a medium point in a current path of: signal node "Sig"—load resistance R1—memory cell MC1—Vss. By contrast, node V2 of memory circuit 521-2 another medium point in another current path of: Vdd—load resistance R2—memory cell MC2—signal node "Sig". "H" or "L" is supplied as the signal "Sig" in accordance with address bit information, and level states of nodes V1 and V2 will be decided.

FIG. 21 shows data states of nodes V1 and V2 in case of judging match/no match of the input signal "Sig" in association with the programmed data. "Pair0" designates that the both resistance values of the memory cell pair are high while "Pair1" designates that the both resistance values of the memory cell pair are low. Sig=0 and Sig=1 show that signal levels are "L" (=Vss) and "H" (=Vdd), respectively.

In case of Pair0, both memory cells MC1 and MC2 are in the high resistance state, so that node V1 becomes "L" and "H" in accordance with Sig=0 and Sig=1, respectively, while node V2 becomes "H" without regard to "Sig". In case of Pair1, both memory cells MC1 and MC2 are in the low resistance state, so that node V2 becomes "L" and "H" in accordance with Sig=0 and Sig=1, respectively, while node V1 becomes "L" without regard to "Sig".

Therefore, as shown in FIG. 20, taking exclusive OR logic between nodes V1 and V2 with EXOR gate G32, match signal m="h" will be obtained only when the information of the memory cell pair and the input signal "Sig" are matched with each other.

FIG. 22 shows the state in case there is no information programmed. In the memory cell pair with no programmed information, resistance values of the memory cells are different from each other. Here, the resistance states of the memory cell pair are shown as (LR). That is, Pair (01) shows that the left side cell (L) and the right side cell (R) are set in the high resistance state and low resistance state, respectively. Applying signal "Sig" to this memory cell pair set in the above-described state, the both nodes V1 and V2 become "L" in case of Sig=0 while these become "H" in case of Sig=1. Therefore, taking exclusive OR of these nodes V1 and V2, it always becomes m=0 (no match).

Figure 23:
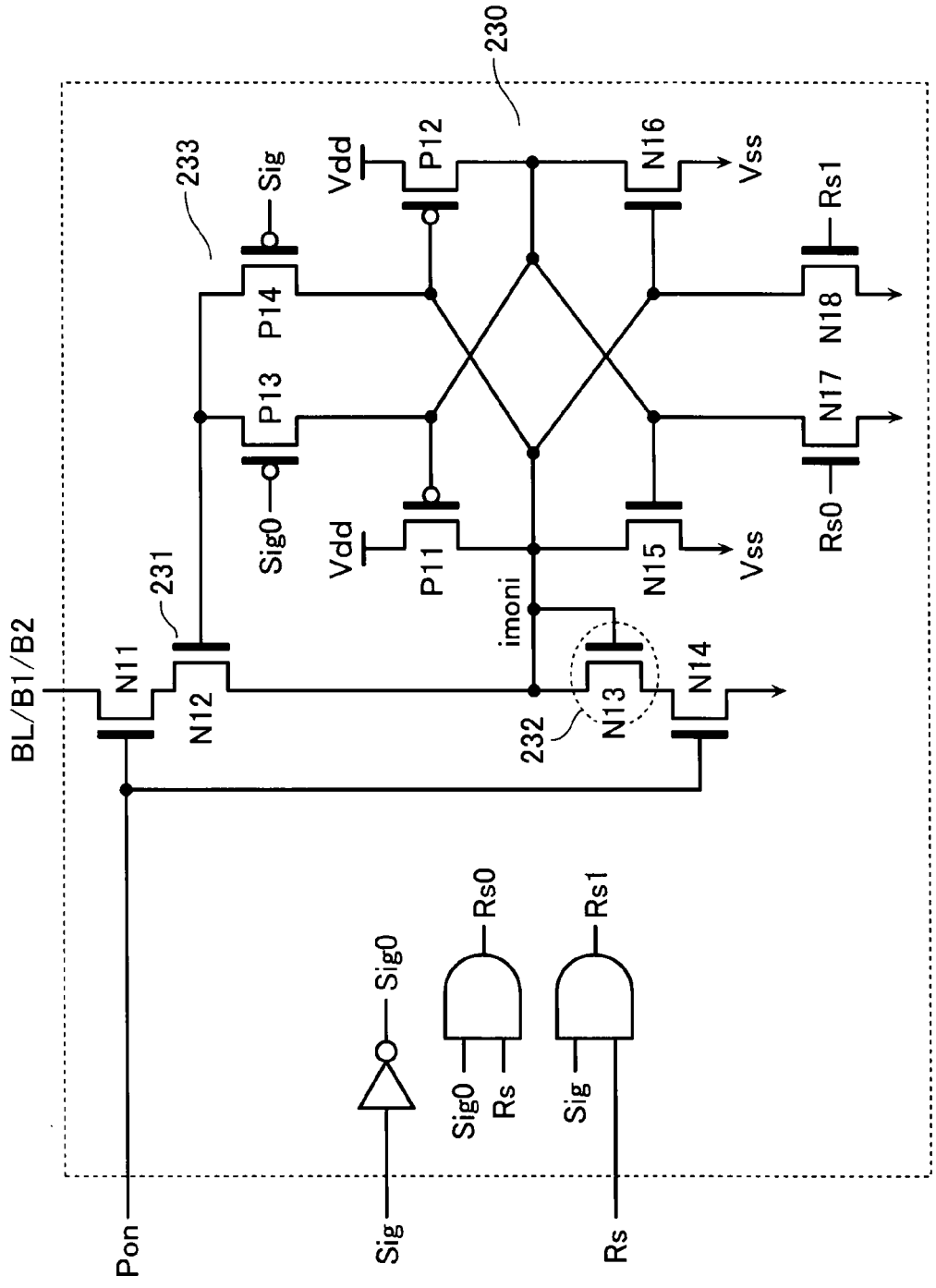
FIG. 23 shows the configuration of a current cutter circuit used in the key address parts.

FIG. 23 shows the example of the current cutter circuit 522 (or 532), which serves for programming (i.e., setting the resistance states of) the memory cells MC1 and MC2 by use of controlling the current and voltage applied to them. It is assumed here that the variable resistance element VR is formed of such a material system defined by the following properties: a high resistance state (e.g., data "0") is a stable state; apply voltage to the high resistance cell, and a low resistance state (e.g., data "1") is obtained; and apply Joule's heat to the low resistance cell by the cell current, and the high resistance state (data "0") is restored.

This current cutter circuit includes: state transition circuit 230, the initial state of which is set in accordance with the program information of memory cell; current monitor device 232 formed of diode-connected NMOS transistor N13 for detecting cell current changed in accordance with resistance change of the memory cell; and switch device 231 formed of NMOS transistor N12, which serves for cutting the cell current in accordance with the state change of the state transition circuit 230 detected by the monitor device 232.

The state transition circuit 230 is a flip-flop. Disposed between two nodes of the flip-flop and the gate of NMOS transistor N12 is a switch circuit 233 with PMOS transistors P13 and P14, which serves for turning on the NMOS transistor N12 at an initial state of both of "1" write and "0" write, and turning off it on receipt of the state transition at the write completion time.

A current path formed of switch device 231 and current monitor device 232, which are serially coupled to a memory cell to be programmed, is separated from the memory cell before the program starting with NMOS transistors N11 and N14, which are driven by start signal "Pon". Note here that the flip-flop is so designed in size as to take in a small current, and apply little influences to the cell current of the variable resistance element of the memory cell.

To set the initial state in the flip-flop, apply signals "Rs0" and "Rs1" to reset NMOS transistors N17 and N18, respectively. These signals are generated synchronously with a reset signal "Rs" in accordance with signal "Sig" and the inverted signal "Sig0". That is, NMOS transistor N15 of the flip-flop 230 is turned off in accordance with "Rs0", current monitor node "imoni" is set at "H". In accordance with signal "Rs1", the reversed state will be set.

The gates of PMOS transistors P13 and P14 in the switch circuit 233 are driven by "Sig0" and "Sig", respectively. With this switch circuit 233, the gate of NMOS transistor N12 is coupled to one node set as "H" in the flip-flop 230 and turned on without regard to the initial state of the flip-flop.

After initializing the flip-flop in accordance with data to be programmed, the program start signal "Pon" becomes "H" for starting the program of the variable resistance element of the memory cell, so that the bit line BL of the memory cell array is coupled to this current cutter circuit. In detail, in case the cell to be programmed is one in the bit match circuit, this bit line BL is node B1 or B2.

The cell current in the memory cell flows through the switch device 231 to the node "imoni", and successively flows through the current monitor device 232, which is formed of diode-connected NMOS transistor N13 (or another transistor with the gate set at level Vref for limiting the device current), to be discharged to Vss. Therefore, the node "imoni" is set in level in accordance with cell current. In detail, when the node "imoni" is over a level, the state of flip-flop is changed, and switch device 231 is turned off to cut the cell current.

FIG. 24 shows the relationships between cell state "0" (high resistance state) to be programmed and cell state "1" (low resistance state), in which initial states and program completion states are shown with respect to the monitor node "imoni" and switch device 231.

At a "0" program time, the initial state is imoni="H", and switch device 231 is driven through PMOS transistor P13 to be on. If the cell state before programming is "1", a large cell current flows to the monitor node "imoni" and keeps level thereof. Soon, as the memory cell becomes a high resistance state with Joule's heat, the cell current decreases to make the monitor node "imoni" low. As a result, the flip-flop is inverted from the initial state, and this makes the switch device 231 off.

If the cell is in a "0" state before programming, the monitor node "imoni" becomes "H" simultaneously with the start of programming, and this makes soon the switch device 231 off.

At a "1" program time, the initial state is imoni="L", and switch device 231 is driven through PMOS transistor P14 to be on. If the cell state before programming is "0", a small cell current flows to the monitor node "imoni" and keeps level thereof. Soon, as the memory cell becomes a low resistance state with voltage applied, the cell current increases to make the monitor node "imoni" high. As a result, the flip-flop is inverted from the initial state, and this makes the switch device 231 off.

If the cell is in a "1" state before programming, the monitor node "imoni" becomes "H" simultaneously with the start of programming, and this makes soon the switch device 231 off.

The above-described cell programming method with the current cutter circuit will be adapted likewise to the programming of the content data part in CAM.

Figure 25:
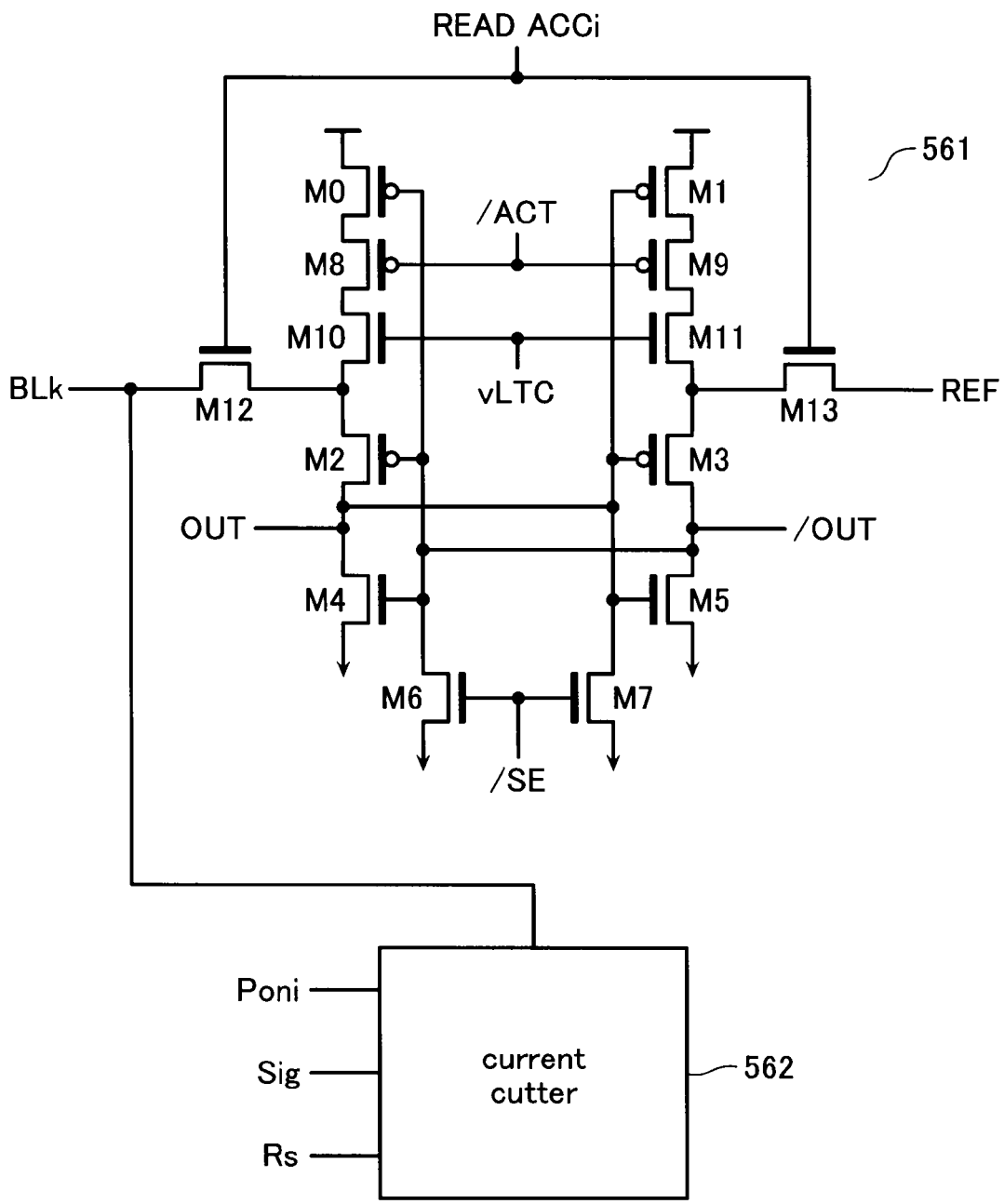
FIG. 25 shows the configuration of the read/write control circuit in the CAM.

FIG. 25 shows a detailed construction of the read/write control circuit 56 in CAM, which has sense amplifier 561 used for reading the content data part 51 and current cutter circuit 562 used at a write (program) time. Current cutter circuit 562 is formed as similar to that shown in FIG. 23.

Sense amplifier 561 is of a current-sensing type, which is the same as that used in the file memory 1 as shown in FIG. 15. This sense amplifier detects cell current on a selected bit line BLk in comparison with reference current supplied to the reference node REF. On receipt of signal READACCi, the sense amplifier is coupled to bit line BLk and reference bit line REF.

At a data program time for the content data part, READACCi is kept at "L", and the sense amplifier and bit line BLk are separated from each other. Instead of READACCi, signal "Poni" becomes "H", so that current cutter circuit 562 is coupled to the bit line BLk. Signal "Sig", i.e., data to be programmed, and initializing signal "Rs" are input to the current cutter circuit 562. The operation of the current cutter circuit 562 is the same as described above.

Figure 26:
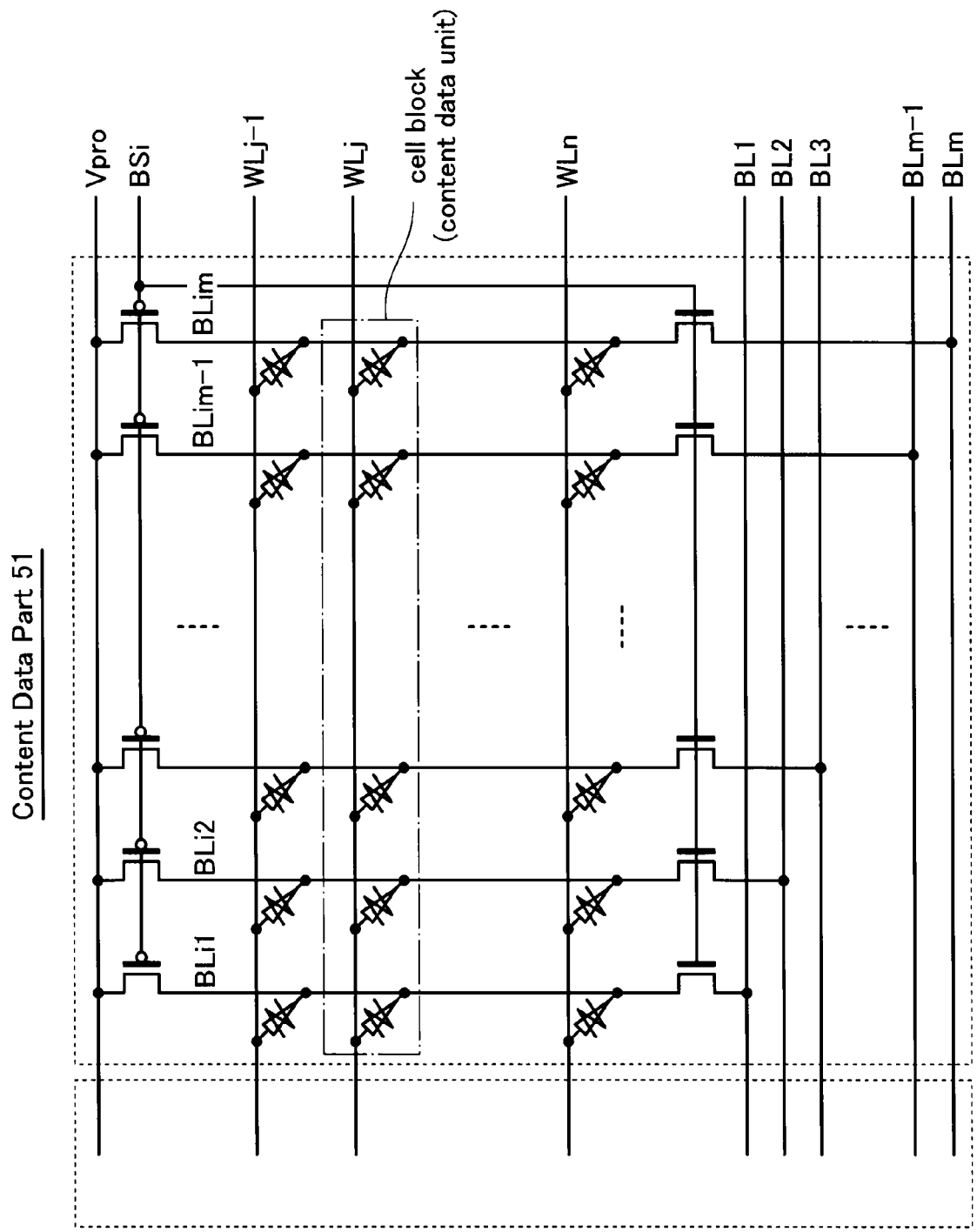
FIG. 26 shows the configuration of the content data part of the CAM.

FIG. 26 shows a detailed configuration of the content data part 51 in CAM. CAM stores substitutive block addresses used in place of bad block addresses. Therefore, supposing that the number of address bits is "m", a cell block as a unit of CAM is formed of m-bits.

To store the address data in a non-volatile manner, a memory cell used for storing one bit is formed of a variable resistance element and a diode as well as in the key address parts 52 and 53. Column select line (signal) BSi is prepared for selecting a column of the cell blocks, and this is decoded by key address part 52. To select the row of the cell blocks, row select lines (signals), i.e., word lines WLj, are prepared, and these are decoded by key address part 53. "m" bit lines BLij (j=1~m) of a cell block are selected simultaneously by BSi and coupled to "m" global bit lines BLj, respectively, which are common to the respective columns.

Bit lines BLij directly coupled to the memory cells are set at the power supply voltage Vpro, which is the highest voltage in the cell array area, at a non-selected time. At a read time or a program time, when selected by BSi, these bit lines are separated from Vpro to be in a floating state, and then coupled to the ground potential Vss via the global bit lines and sense amplifiers.

At a read time or a write time, word line WLj selected by decoders in the key address part 53 is set at Vread (read time) or Vpro (write time) from Vss. As a result, the diode in the selected cell becomes on, and current flows in memory cells only in a selected cell block.

Next, it will be explained the detailed configurations of the address generating shift counters constituting the decoder pointers 54 and 55. 4-bit shift counter, 8-bit shift counter, 10-bit shift counter are explained here. It is supposed here that 4×8=32 bit shift is performed for key address part 52; and 10 bit shift for key address part 53. In other words, here is supposed that the CAM is formed of 320 cell blocks of 32 columns×10 rows.

Each shift counter is formed of serially connected latch circuits with the same configuration serving as a unit. The boundary between "0" and "1" is reciprocated on the latch array in the left or right direction bit by bit synchronously with clocks, so that a count address is obtained in accordance with the moving direction information and position information. With this principle, a small circuit scale may be achieved.

Figure 27:
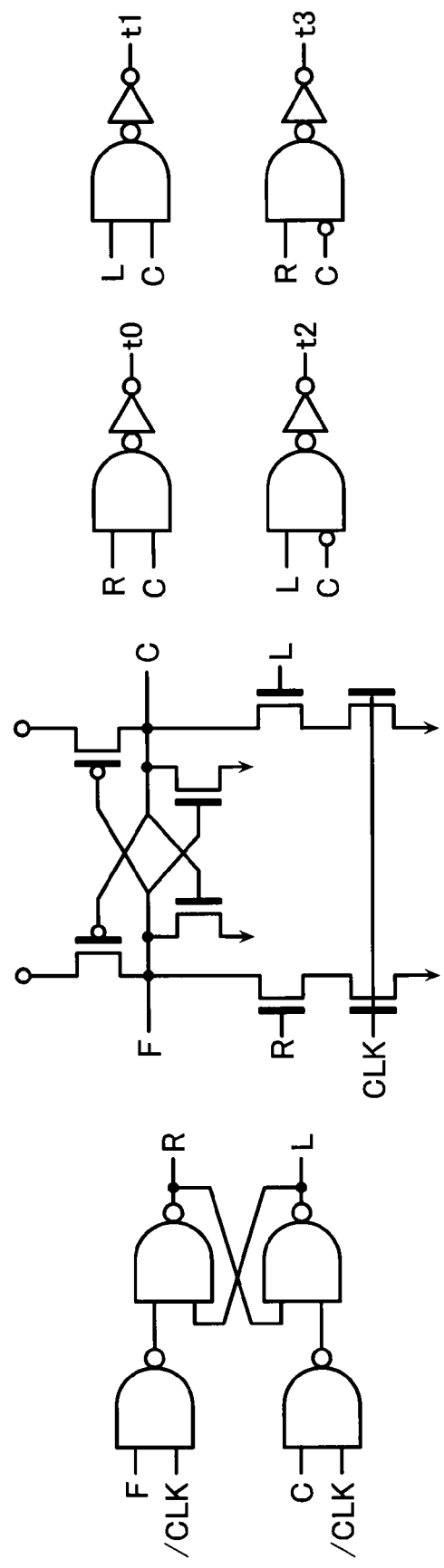
FIG. 27 shows a 4-bit shift counter used for constituting a pointer of the key address parts of CAM.
Figure 28:
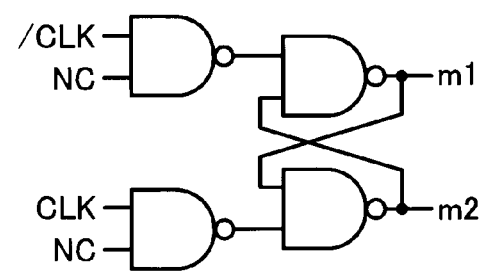
FIG. 28 shows the signal input mode of the shift counter.
Figure 28:
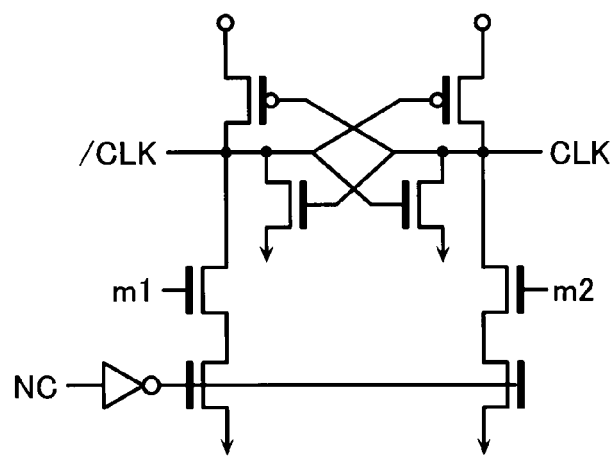

FIG. 27 shows a 4-bit shift counter. t0~t3 are 4-bit outputs. As shown in FIG. 28, the clock cycle of this counter is defined by non-correctable signal NC, the falling edge of which makes the internal clock CLK toggled.

Figure 30:
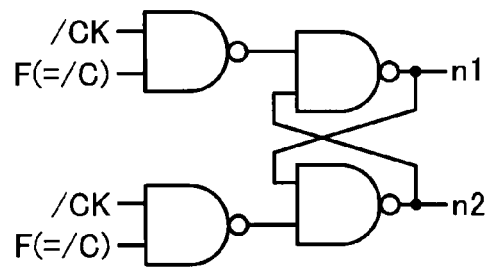
FIG. 30 shows the signal input mode of the shift counter.
Figure 30:
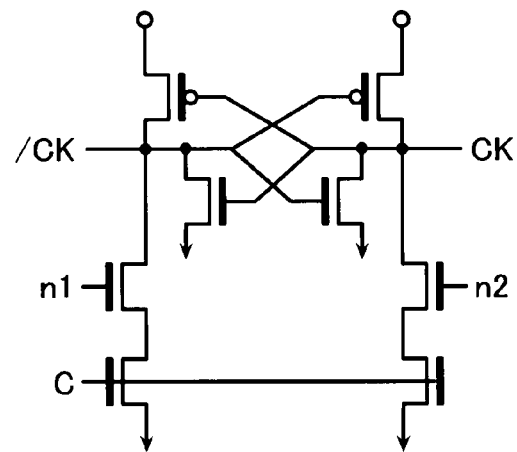
Figure 29:
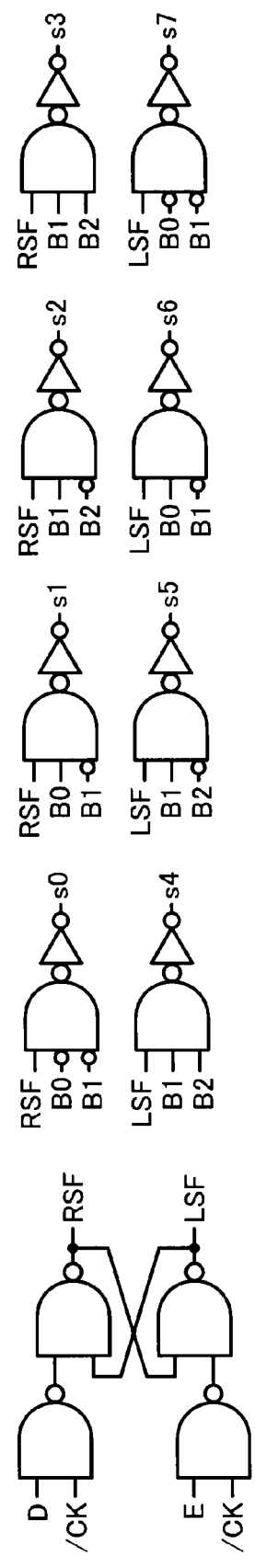
FIG. 29 shows a 8-bit shift counter used for constituting a pointer of the key address parts of CAM.
Figure 29:
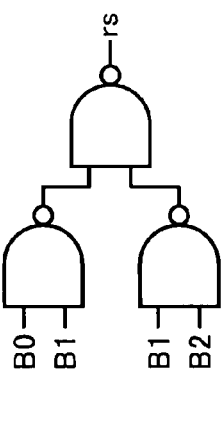
Figure 29:
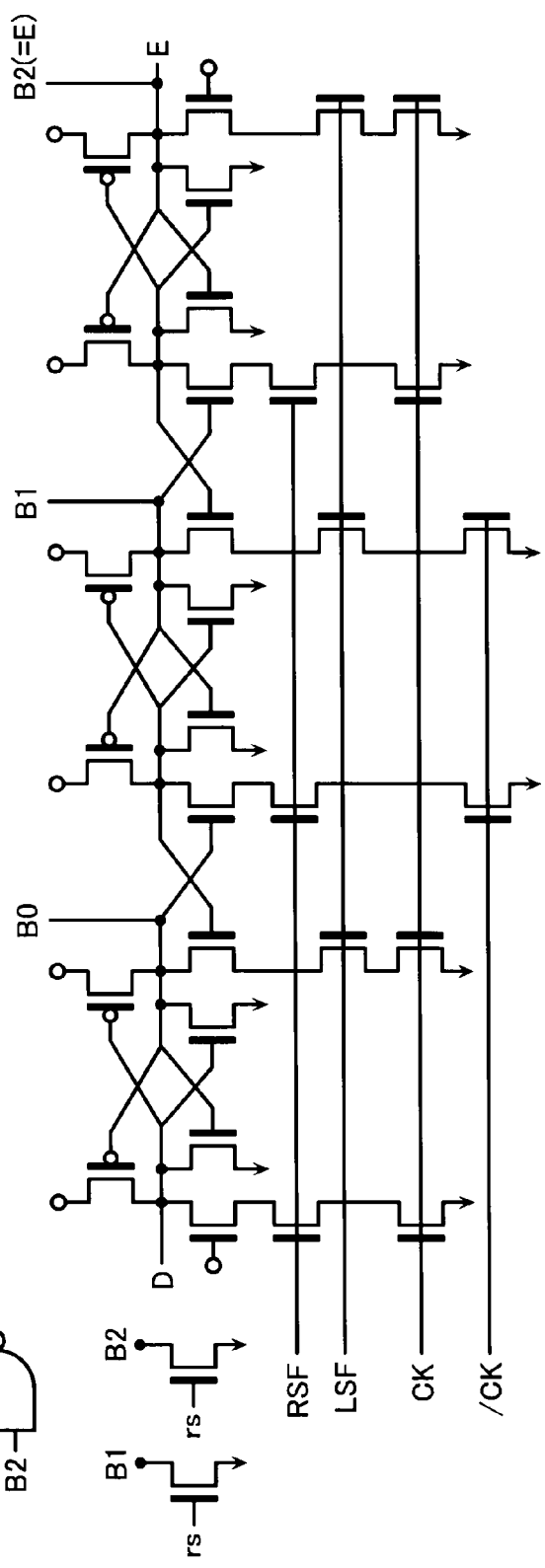

FIG. 29 shows an 8-bit shift counter. s0~s7 are 8-bit outputs. The clock cycle is defined by one round of the 4-bit outputs t0~t3. As shown in FIG. 30, this is achieved by generating clock CK that is toggled with one cycle of "C".

To make nodes B0, B1 and B2 of three units constituting the 8-bit shift counter function as the shift counter, it is necessary to exclude unnecessary states. For this purpose, as shown in FIG. 29, signal "rs" is formed in accordance with certain logic of nodes B0-B2. With this signal "rs", the node on the left side of the boundary between "1" and "0" is always set at "1" while the node on the right side of the boundary is always set at "0".

Figure 31:
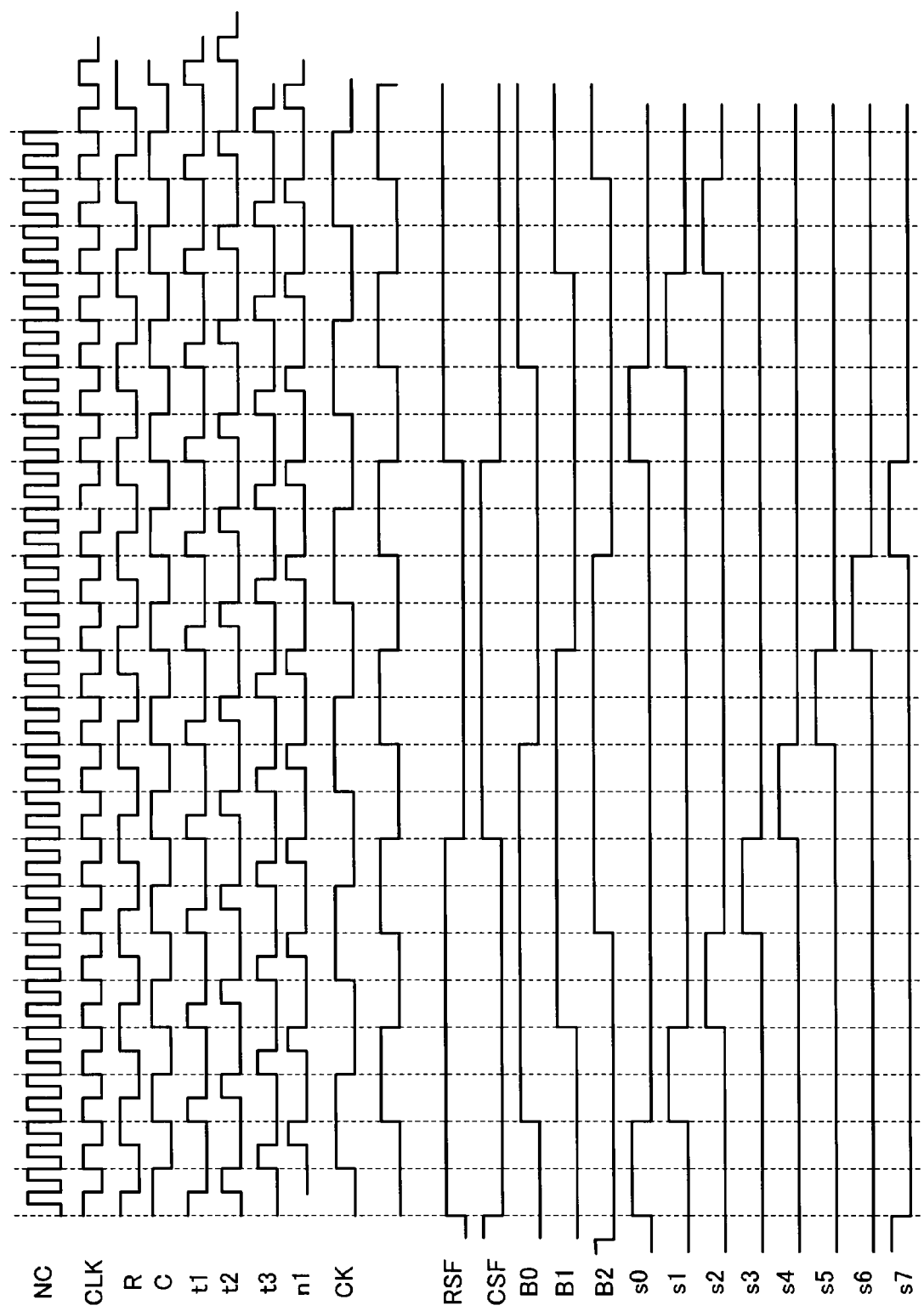
FIG. 31 shows waveforms of the 4-bit shift counter and 8-bit shift counter.

FIG. 31 shows the potential changes for main nodes in the 4-bit shift counter and 8-bit shift counter. Here, non-correctable signal NC is expressed as though with regular cycles, but it will be generated irregularly in practice. That is, the period of NC="H" is about one memory cycle, and the time length until the next NC rising is varied irregularly.

Figure 32:
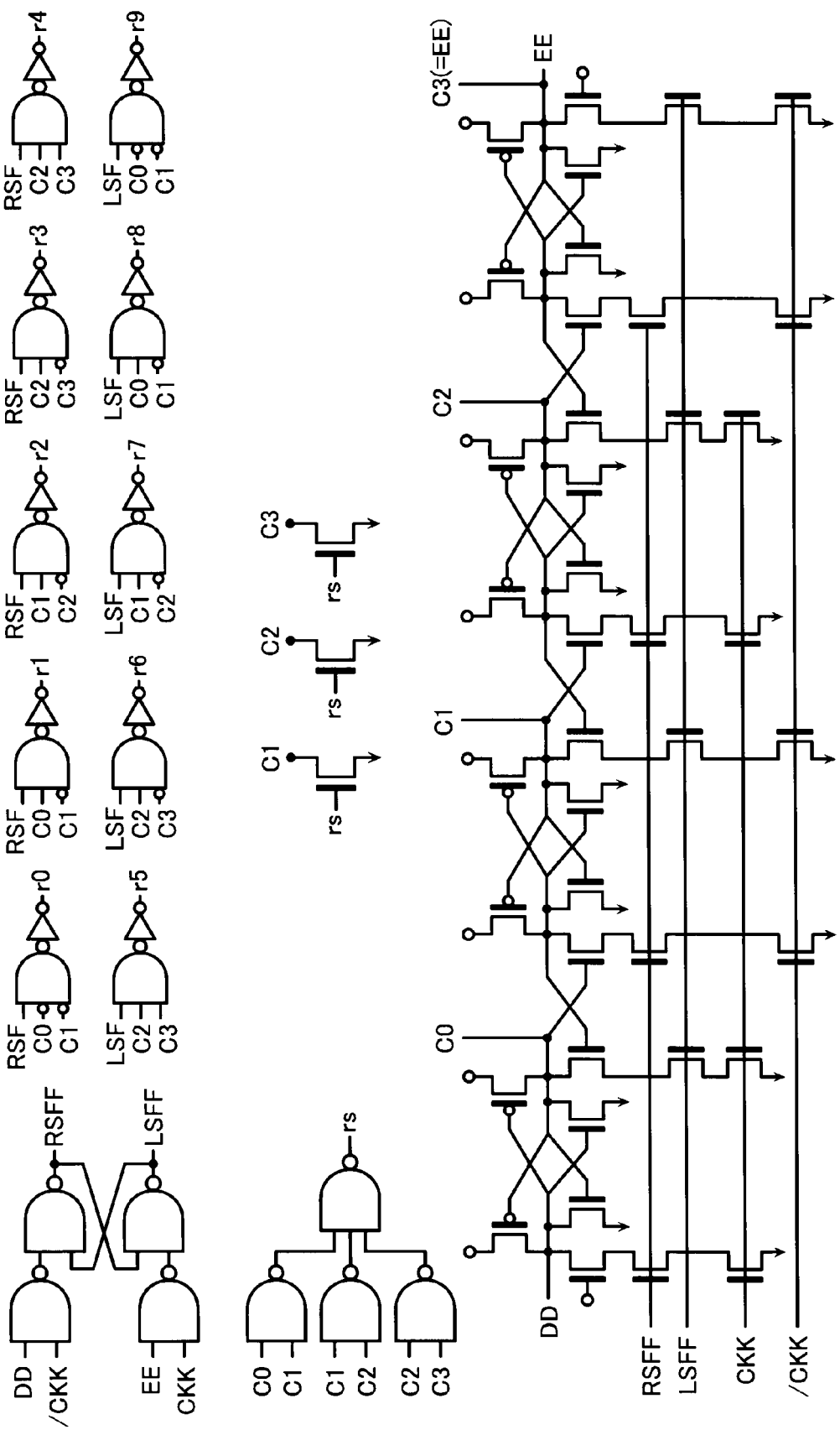
FIG. 32 a 10-bit shift counter used for constituting a pointer of the key address parts of CAM.
Figure 33:
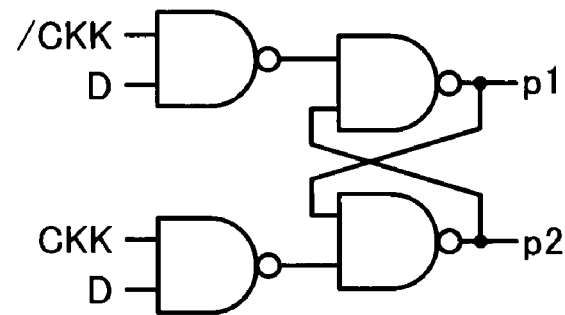
FIG. 33 shows the signal input mode of the shift counter.
Figure 33:
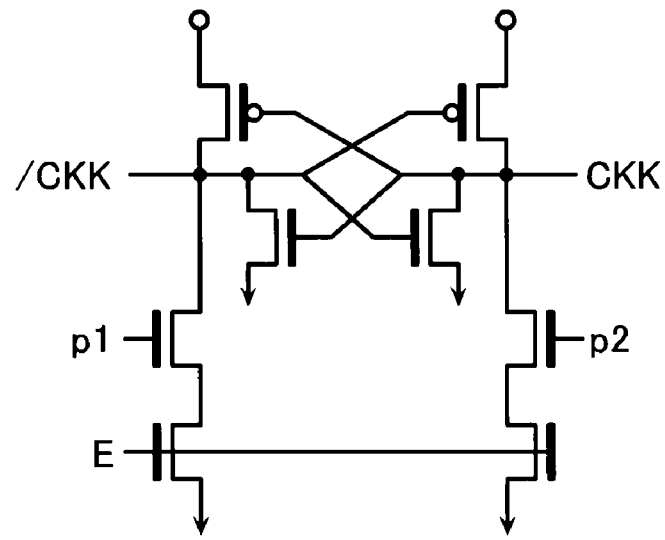

FIG. 32 shows a 10-bit shift counter constituting the decoder pointer 55 on the side of key address part 53. The number of units constituting the shift counter is 4, and by use of the movement of the boundary between "1" and "0" at these nodes. Although the unit numbers are increased by one in comparison with the case of the 8-bit shift counter, the basic operation is the same as the 8-bit shift counter. r0~r9 are 10-bit outputs. The clock cycle is, as shown in FIG. 33, achieved by generating clock CKK that is toggled with one cycle of "E".

A cue for moving the boundary between "1" and "0" in the left direction is given by node EE and a clock toggle followed that setting the node EE to be "1", i.e., the timing when EE and CKK become "H" serves as the cue. It should be noted that the phase of the clock toggle making the moving direction of "1" inverted at the terminal node in the 10-bit shift counter with even unit numbers is different from that in another shift counter with odd unit numbers.

To make nodes C0 to C3 of four units constituting the 10-bit shift counter function as the shift counter, it is necessary to exclude unnecessary states. For this purpose, as shown in FIG. 32, signal "rs" is formed in accordance with certain logic of nodes C0-C3. With this signal "rs", the node on the left side of the boundary between "1" and "0" is always set at "1" while the node on the right side of the boundary is always set at "0".

Next, it will be explained the logic for corresponding the outputs "tα(α=0~3)", "sβ(β=0~7)" and "ri(i=0~31)" of the above-described shift counters to the row and column decoders.

Figure 34:
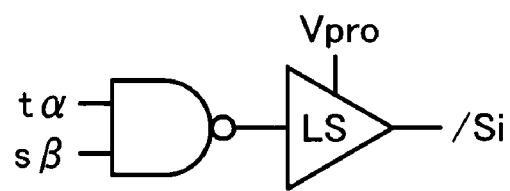
FIG. 34 shows a pointer signal input portion of one key address part.

FIG. 34 shows a NAND gate, which receives "tα" and "sβ" and outputs decoder pointer signal "/Si(i=0~31)" to be input to column decode key address part 52. To boost this output voltage, to the power supply voltage level Vpro, level shifter LS is coupled. The input connections of this NAND are in accordance with the table shown in FIG. 35.

Figures 35, 36:
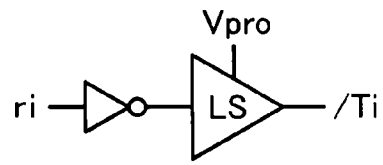
FIG. 35 shows the mode of the pointer signal input.
FIG. 36 shows a pointer signal input portion of the other key address part.

FIG. 36 shows a circuit for outputting decoder pointer signal "/Ti(i=0~9)" to be input to row decode key address part 53, which has an inverter receiving "ri(i=0~9)" and a level shifter LS for boosting the output to the power supply voltage Vpro.

As described above, the shift counter designating the column and row decoders is used at a data write time of CAM, i.e., when the substitutive block address is set together with key addresses. In this case, the latest position of the shift counter shows the cell block position in the latest substitutive block address CAM. Therefore, using this information, it becomes possible to set the head address of the substitutive block address generation circuit when the memory system is raised after power off.

For this purpose, it is necessary to keep the shift counter state after power off. The shift counter state will be kept with signals of nodes CLK, C, CK, B0, B1, CKK, C0, C1 and C2. By use of non-volatile semiconductor memory cells with variable resistance elements, these node states are stored.

Figure 37:
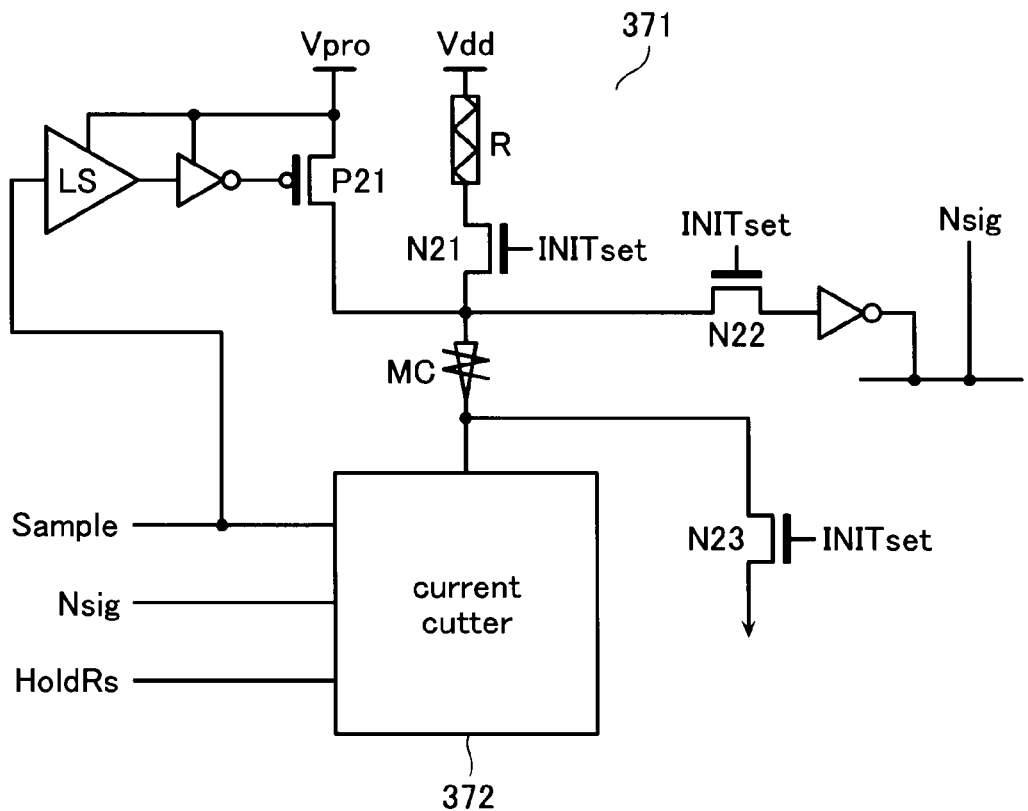
FIG. 37 shows a state holding circuit of the shift counter.

FIG. 37 shows a data hold circuit configured to store the above-described node signals expressed by "Nsig". This data hold circuit has a non-volatile memory circuit 371, in which one node of the same memory cell MC as in the file memory 1 is coupled to the power supply node Vdd via NMOS transistor N21 and load resistance R; and the other node to the ground potential Vss via NMOS transistor N23.

Coupled to the lower course node of the memory cell MC is current cutter circuit 372. This circuit 372 is the same as that shown in FIG. 23, and signals "Sample", "Nsig" and "HoldRs" correspond to "Pon", "Sig" and "Rs", respectively, in FIG. 23.

At the write time of memory cell MC, write-use power supply voltage Vpro is applied to the memory cell via PMOS transistor P21 with signals "Sample" and "INITset" set at "H" and "L", respectively. Since current cutter circuit 372 is coupled to the memory cell MC, with signal HoldRs="H" applied just before the signal Sample="H", the node information "Nsig" is taken in. When signal "Sample" is "H", the current cutter circuit 372 functions to program a resistance state corresponding to "Nsig" in the memory cell MC. That is, if "Nsig" is "H", a high resistance state is set; and if "Nsig" is "L", a low resistance state is set.

The above-described program operation may be performed for storing the shift counter state in a non-volatile manner at every cycle. Alternatively, it may be performed once for storing the final state of the shift counter when the power is off. Note here that the latter method is not adaptable for an accidental power off.

To set a start address of address generation when the power is made on in the address generating circuit for generating the substitutive block addresses of the bad block addresses, signal "INITset" is set at "H" after the power supply voltage is raised. At this time, signal "Sample" is "L", and PMOS transistor P21 is off because the gate is set at Vpro via level shifter LS, so that the memory cell MC is separated from the write-use power supply voltage Vpro.

On the other hand, one node of the memory cell MC is coupled to Vdd via NMOS transistor N21 and load resistance R; and the other node to Vss via NMOS transistor N23. Therefore, the connection node level between the load resistance R and memory cell MC is transferred to Nsig node via NMOS transistor N22 and an inverter, so that it becomes possible to set the selected state of the CAM decoder at the state just before the power off.

Reading the cell block data from the CAM selected as described above, and setting the initial value in the address generating circuit, it is able to set the latest state just before the power off in the system.

Figure 38:
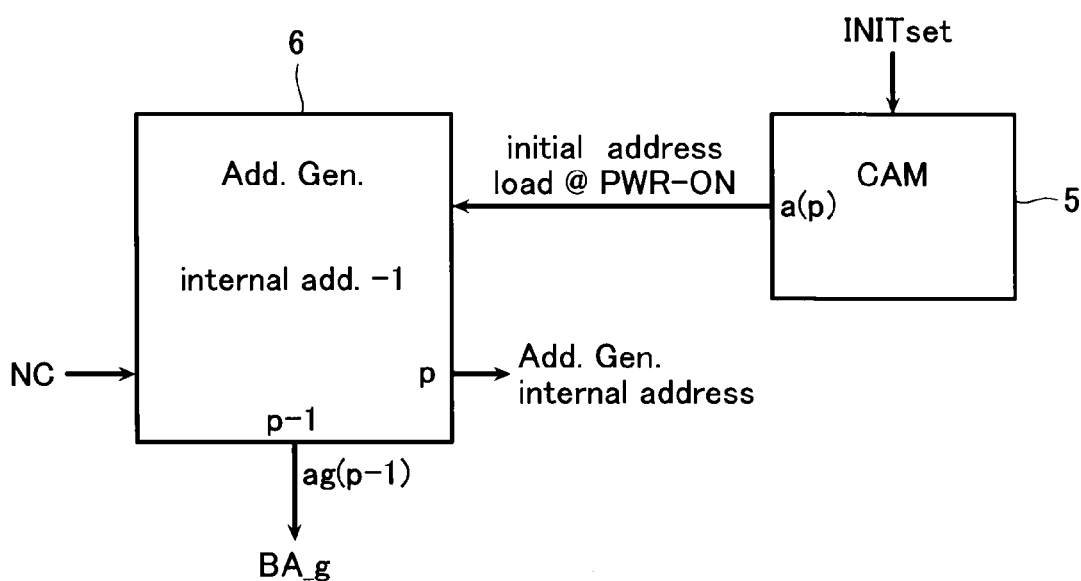
FIG. 38 is a diagram for explaining the initial setting operation by CAM of address generating circuit in the memory controller.

Next, the method of setting a state of the address generating circuit 6, which generates the substitutive block addresses of non-correctable block addresses, will be explained with reference to FIG. 38.

After power on, supply signal INITset to CAM 5 to read block address "a(p)", i.e., stored data, and decode and set the internal address "p" of the address generating circuit 6. The address generating circuit 6 receives the non-correctable signal NC from the ECC system in the file memory 1, and outputs internal address "p-1", that is subtracted by one from the current address "p".

Since address designation in the file memory with this internal address "p-1" corresponds to the block address ag(p-1), the address generating circuit 6 generates "ag(p-1)" as a block address BA_g.

The current value "p" of the internal address in the address generating circuit 6 shows an effective capacity of the file memory. That is, the block address range expressed in the serial order of 0~p-1 may be used as a block area, which does not generate errors.

As described above, according to this embodiment, it becomes possible to use a file memory with a large capacity without testing it, and there is provided a memory device, in which there is no defect when viewing from the external. Although a non-volatile memory device with variable resistance elements has been explained in the above-described embodiment, it should be noted here that the present invention is adaptable to other kinds of non-volatile memory devices, for example, a NAND-type flash memory and the like.

The embodiments described above will be summarized as follows.

(1) A memory system including:

a memory device;

an error detecting and correcting system installed in the memory device so as to generate a warning signal in case there are uncorrectable errors in the memory device;

an address generating circuit configured to generate internal addresses in place of bad area addresses in accordance with the waning signal, the progressing of the internal addresses being selected in such a manner as to avoid address collision with the address progressing of the memory device at least at the beginning of it; and a content addressable memory configured to store the internal addresses as substitutive area addresses, the content addressable memory being referred to at an access time of the memory device so as to generate the substitutive area addresses in place of the bad area addresses in accordance with the warning signal.

(2) The memory system defined in (1), wherein the content addressable memory includes:

a content data part configured to store the substitutive area addresses in a non-volatile manner;

first and second key address parts configured to store key addresses corresponding to the bad area addresses in a non-volatile manner, the first and second key address parts serving as column and row decoders, respectively, used for reading the substitutive area addresses in the content data part; and a selector configured to select a corresponding substitutive area address when an externally supplied address is matched with one of the key addresses defined in the first and second key address parts, and output the externally supplied address as it is when the address matching is not detected.

(3) The memory system defined in (2), wherein the first and second key address parts include first and second groups of bit match circuits, which store the lower bits and the upper bits of each key address to detect match/no match between the externally supplied address and the stored key address, respectively.

(4) The memory system defined in (3), wherein the bit match circuit in the first and second groups of bit match circuits includes a non-volatile memory circuit, which has a pair of memory cells with variable resistance elements, the pair of memory cells being written in such a state as to output a match signal when the input data is matched with the written data.

(5) The memory system defined in (4), further including:

a current cutter circuit so coupled to the bit match circuit as to monitor the current flowing in the pair of memory cells and cut off it when detecting the write completion.

(6) The memory system according to defined in (3), wherein the bit match circuit in the first and second groups of bit match circuits includes:

first and second memory cells constituting a pair, each of which has a variable resistance element;

a first pair of switching devices for coupling one end of the first memory cell to an input node of a bit signal, match/no match of which is to be detected between the written data, via a first load resistance, and coupling one end of the second memory cell to the power supply node via a second load resistance at a read time;

a second pair of switching devices for coupling the other end of the first memory cell to the ground potential node, and coupling the other end of the second memory cell to the input node at the read time; and a third pair of switching devices for coupling the respective one ends of the first and second memory cells to a program voltage applying node at a write time, and wherein the first and second memory cells are set in such an initial state that one is in a high resistance state while the other is in a low resistance state, and are written into such a state that both of them are set in a high resistance state or a low resistance state.

(7) The memory system defined in (6), further including:

current cutter circuits so selectively coupled to the other ends of the first and second memory cells at a write time to monitor the current flowing in them and cut off it when detecting the write completion.

(8) The memory system defined in (5), wherein the current cutter circuit includes:

a current monitor device coupled to the memory cell in the bit match circuit via a transistor; and a state transition circuit configured to control ON/OFF of the transistor in accordance with the output of the current monitor device.

(9) The memory system defined in (8), wherein the memory cell in the bit match circuit is formed to have a "1" write mode, in which a low resistance state is set from a high resistance state with voltage applied, and a "0" write mode, in which the high resistance state is set from the low resistance state with Joule's heat, and further includes:

a switch circuit disposed between the state transition circuit and the gate of the transistor to turning on the transistor in an initial state of the state transition circuit without regard to "1" or "0" write mode, and turning off the transistor in accordance with the state-inverting of the state transition circuit due to a certain decrease and increase of the cell current in the "1" and "0" write modes.

(10) The memory system defined in (2), wherein the content addressable memory further includes:

a read/write control circuit disposed between the content data part and the selector.

(11) The memory system defined in (10), wherein
the read/write control circuit includes:
a sense amplifier of a current sensing type for detecting the information of the content data part; and
a current cutter circuit configured to monitor the cell current of the content data part at a write time and cut off it when detecting the write completion.

(12) The memory system defined in (2), wherein
each the first and second key address parts includes a shift counter serving as a decode pointer, which sets a key address in accordance with the number of the warning signal's toggle.

(13) The memory system defined in (12), wherein
each the first and second key address parts further includes a non-volatile memory circuit, which stores the state of the shift counter at a power-off time in a non-volatile manner, and sets the shift counter in a state just before the power-off at a power-on time.

(14) The memory system defined in (1), wherein
the memory device includes:
a semiconductor substrate;
a plurality of cell arrays stacked on the semiconductor substrate, in each of which memory cells including variable resistance elements are arranged;
a read/write circuit formed on the semiconductor substrate;
first vertical via-wirings disposed on the both end sides of word lines in the cell arrays for coupling the word lines alternately to the read/write circuit; and
second vertical via-wirings disposed on the both end sides of bit lines in the cell arrays for coupling the bit lines alternately to the read/write circuit.

(15) The memory system defined in (14), wherein
the read/write circuit includes:
a first data bus disposed in parallel with the word lines in the cell array;
two sense amplifier arrays disposed to sandwich the first data bus, and coupled to the bit lines drawn by the second vertical via-wirings;
two second data buses disposed on the both ends of the first data bus to be perpendicular to the first data bus; and
word line decoders disposed outside of the second data buses to be coupled to the word lines drawn by the first vertical via-wirings.

(16) A memory system including:
a memory device;
an error detecting and correcting system installed in the memory device so as to generate a warning signal in case there are uncorrectable errors in the memory device; and
a content addressable memory configured to store substitutive area addresses, the content addressable memory being referred to when accessing the memory device so as to generate the substitutive area addresses in place of bad area addresses in accordance with the warning signal, wherein
the content addressable memory includes: a non-volatile memory circuit formed of non-volatile semiconductor memory cells; and a current cutter circuit selectively coupled to the memory cell at a write time of the memory cell so as to monitor current flowing therein and cut off it when detecting the write completion.

(17) The memory system defined in (16), further including:
an address generating circuit configured to generate internal addresses serving as the substitutive area addresses in place of bad area addresses in accordance with the warning signal, the progressing of the internal addresses being selected in such a manner as to avoid address collision with the address progressing of the memory device at least at the beginning of it, and wherein
the content addressable memory includes:
a content data part configured to store the substitutive area addresses in a non-volatile manner;
first and second key address parts configured to store key addresses corresponding to the bad area addresses in a non-volatile manner, the first and second key address parts serving as column and row decoders, respectively, used for reading the substitutive area addresses in the content data part; and
a selector configured to select a corresponding substitutive area address when an externally supplied address is matched with one of the key addresses defined in the first and second key address parts, and output the externally supplied address as it is when the address matching is not detected.

(18) The memory system defined in (17), wherein
the first and second key address parts include first and second groups of bit match circuits, which store the lower bits and the upper bits of each key address to detect match/no match between the externally supplied address and the stored key address, respectively.

(19) The memory system defined in (18), wherein
the bit match circuit in the first and second groups of bit match circuits includes the non-volatile memory circuit, which has a pair of memory cells to be written in such a state as to output a match signal when the input data is matched with the written data.

(20) A memory device including:
a non-volatile memory circuit with memory cells having variable resistance elements; and
a current cutter circuit selectively coupled to the memory cell at a write time of the memory cell so as to monitor current flowing therein and cut off it when detecting the write completion.

This invention is not limited to the above-described embodiment. It will be understood by those skilled in the art that various changes in form and detail may be made without departing from the spirit, scope, and teaching of the invention.

What is claimed is:
1. A memory system comprising:
a memory device;
an error detecting and correcting system installed in the memory device so as to generate a warning signal in case there are uncorrectable errors in the memory device;
an address generating circuit configured to generate internal addresses in place of bad area addresses in accordance with the warning signal, progressing of the internal addresses being selected in such a manner as to avoid address collision with the address progressing of the memory device at least at the beginning of it; and
a content addressable memory configured to store the internal addresses as substitutive area addresses, the content addressable memory being referred to at an access time of the memory device so as to generate the substitutive area addresses in place of the bad area addresses in accordance with the warning signal, wherein
the content addressable memory comprises:
a content data part configured to store the substitutive area addresses in a non-volatile manner;
first and second key address parts configured to store key addresses corresponding to the bad area addresses in a non-volatile manner, the first and second key address parts serving as column and row decoders, respectively, used for reading the substitutive area addresses in the content data part; and
a selector configured to select a corresponding substitutive area address when an externally supplied address is matched with one of the key addresses defined in the first and second key address parts, and output the externally supplied address as it is when the address matching is not detected.

2. The memory system according to claim 1, wherein
the first and second key address parts comprise first and second groups of bit match circuits, which store the lower bits and the upper bits of each key address to detect match/no match between the externally supplied address and the stored key address, respectively.

3. The memory system according to claim 2, wherein
the bit match circuit in the first and second groups of bit match circuits comprises a non-volatile memory circuit, which has a pair of memory cells with variable resistance elements, the pair of memory cells being written in such a state as to output a match signal when the input data is matched with the written data.

4. The memory system according to claim 3, further comprising: a current cutter circuit so coupled to the bit match circuit as to monitor the current flowing in the pair of memory cells and cut off the current when detecting the write completion.

5. The memory system according to claim 2, wherein
the bit match circuit in the first and second groups of bit match circuits comprises:
first and second memory cells constituting a pair, each of which has a variable resistance element;
a first pair of switching devices for coupling one end of the first memory cell to an input node of a bit signal, match/no match of which is to be detected between the written data, via a first load resistance, and coupling one end of the second memory cell to the power supply node via a second load resistance at a read time;
a second pair of switching devices for coupling the other end of the first memory cell to the ground potential node, and coupling the other end of the second memory cell to the input node at the read time; and
a third pair of switching devices for coupling the respective one ends of the first and second memory cells to a program voltage applying node at a write time, and wherein
the first and second memory cells are set in such an initial state that one is in a high resistance state while the other is in a low resistance state, and are written into such a state that both of them are set in a high resistance state or a low resistance state.

6. The memory system according to claim 5, further comprising: current cutter circuits so selectively coupled to the other ends of the first and second memory cells at a write time to monitor the current flowing in them and cut off the current when detecting the write completion.

7. The memory system according to claim 4, wherein
the current cutter circuit comprises:
a current monitor device coupled to the memory cell in the bit match circuit via a transistor; and
a state transition circuit configured to control ON/OFF of the transistor in accordance with the output of the current monitor device.

8. The memory system according to claim 7, wherein
the memory cell in the bit match circuit is formed to have a "1" write mode, in which a low resistance state is set from a high resistance state with voltage applied, and a "0" write mode, in which the high resistance state is set from the low resistance state with Joule's heat, and further comprises:
a switch circuit disposed between the state transition circuit and the gate of the transistor to turning on the transistor in an initial state of the state transition circuit without regard to "1" or "0" write mode, and turning off the transistor in accordance with the state-inverting of the state transition circuit due to a certain decrease and increase of the cell current in the "1" and "0" write modes.

9. The memory system according to claim 1, wherein
the content addressable memory further comprises:
a read/write control circuit disposed between the content data part and the selector.

10. The memory system according to claim 9, wherein the read/write control circuit comprises: a sense amplifier of a current sensing type for detecting the information of the content data part; and a current cutter circuit configured to monitor the cell current of the content data part at a write time and cut off the current when detecting the write completion.

11. The memory system according to claim 1, wherein
each the first and second key address parts comprises a shift counter serving as a decode pointer, which sets a key address in accordance with the number of the warning signal's toggle.

12. The memory system according to claim 11, wherein
each the first and second key address parts further comprises a non-volatile memory circuit, which stores the state of the shift counter at a power-off time in a non-volatile manner, and sets the shift counter in a state just before the power-off at a power-on time.

13. The memory system according to claim 1, wherein the memory device comprises: a semiconductor substrate; a plurality of cell arrays stacked on the semiconductor substrate, in each of which memory cells including variable resistance elements are arranged; a read/write circuit formed on the semiconductor substrate; first vertical via-wirings disposed on the both end sides of word lines in the cell arrays for coupling the word lines alternately to the read/write circuit; and second vertical via-wirings disposed on the both end sides of bit lines in the cell arrays for coupling the bit lines alternately to the read/write circuit.

14. The memory system according to claim 13, wherein
the read/write circuit comprises:
a first data bus disposed in parallel with the word lines in the cell array;
two sense amplifier arrays disposed to sandwich the first data bus, and coupled to the bit lines drawn by the second vertical via-wirings;
two second data buses disposed on the both ends of the first data bus to be perpendicular to the first data bus; and
word line decoders disposed outside of the second data buses to be coupled to the word lines drawn by the first vertical via-wirings.

15. A memory system comprising:
a memory device;
an error detecting and correcting system installed in the memory device so as to generate a warning signal in case there are uncorrectable errors in the memory device; and
a content addressable memory configured to store substitutive are addresses, the content addressable memory being referred to when accessing the memory device so as to generate the substitutive area addresses in place of bad area addresses in accordance with the warning signal; and
an address generating circuit configured to generate internal addresses serving as the substitutive area addresses in place of bad area addresses in accordance with the warning signal, the progressing of the internal addresses being selected in such a manner as to avoid address collision with the address progressing of the memory device at least at the beginning of it, wherein the content addressable memory comprises:

a non-volatile memory circuit formed of non-volatile semiconductor memory cells;

a plurality of current cutter circuits each selectively coupled to the respective memory cells at a write time of the memory cell so as to monitor a current flowing in the memory cell itself coupled to the current cutter circuit and cut off the current when detecting the write completion;

a content data part configured to store the substitutive area addresses in a non-volatile manner;

first and second key address parts configured to store key addresses corresponding to the bad area addresses in a non-volatile manner, the first and second key address parts serving as column and row decoders, respectively, used for reading the substitutive area addresses in the content data part; and a selector configured to select a corresponding substitutive area address when an externally supplied address is matched with one of the key addresses defined in the first and second key address parts, and output the externally supplied address as it is when the address matching is not detected.

16. The memory system according to claim 15, wherein the first and second key address parts comprise first and second groups of bit match circuits, which store the lower bits and the upper bits of each key address to detect match/no match between the externally supplied address and the stored key address, respectively.

17. The memory system according to claim 16, wherein the bit match circuit in the first and second groups of bit match circuits comprises the non-volatile memory circuit, which has a pair of memory cells to be written in such a state as to output a match signal when the input data is matched with the written data.

* * * * *